(12) United States Patent  
Chenin et al.

(10) Patent No.: US 7,854,241 B2  
(45) Date of Patent: Dec. 21, 2010

(54) METAL-CLAD INSULATING COMPLEX FOR A PIPE

(75) Inventors: Laurent Chenin, Le Mesnil St Denis (FR); Francois-Régis Pionetti, La Baleine (FR); Xavier Rocher, Chatou (FR)

(73) Assignee: Saipem S.A., Montigny le Bretonneux (FR)

( * ) Notice: Subject to any disclaimer, the term of this patent is extended or adjusted under 35 U.S.C. 154(b) by 1090 days.

(21) Appl. No.: 11/587,456

(22) PCT Filed: Apr. 29, 2005

(86) PCT No.: PCT/FR2005/001067

§ 371 (c)(1),  
(2), (4) Date: Oct. 24, 2006

(87) PCT Pub. No.: WO2005/121629

PCT Pub. Date: Dec. 22, 2005

(65) Prior Publication Data

US 2007/0221284 A1    Sep. 27, 2007

(30) Foreign Application Priority Data

May 7, 2004    (FR) .................................. 04 04966

(51) Int. Cl.  
    *F16L 9/14* (2006.01)
(52) U.S. Cl. .................. 138/149; 138/148; 138/114; 138/108

(58) Field of Classification Search ................. 138/149, 138/108, 112–114  
See application file for complete search history.

(56) References Cited

U.S. PATENT DOCUMENTS

| 4,985,106 | A  |   | 1/1991  | Nelson ....................... 156/276 |
| 5,370,530 | A  | * | 12/1994 | Facco ......................... 432/236 |
| 5,798,154 | A  |   | 8/1998  | Bryan ........................ 428/35.3 |
| 7,036,531 | B2 | * | 5/2006  | Manini et al. ............... 138/149 |
| 2004/0134556 | A1 | * | 7/2004 | Manini et al. ............... 138/149 |

FOREIGN PATENT DOCUMENTS

| EP | 0790 366 A1 |   | 2/1997 |
| EP | 0 857 833 A1 |   | 1/1998 |
| EP | 1 101 877 A1 |   | 6/2000 |
| EP | 1647759 A2 | * | 4/2006 |
| WO | WO 01/38779 A1 |   | 5/2001 |
| WO | WO 03106777 A1 | * | 12/2003 |

* cited by examiner

*Primary Examiner*—Patrick F Brinson  
(74) *Attorney, Agent, or Firm*—Cohen Pontani Lieberman & Pavane LLP

(57) ABSTRACT

An insulating complex having a metal case and insulating material confined in a vacuum between the inner wall and the outer wall of the case and wherein each of the walls has a metal strip, at least one of which includes corrugations. An insulated pipe and a set of two coaxial pipes are also provided wherein the coaxial pipes are arranged as an inner pipe and an outer pipe, preferably undersea pipes for great depths.

30 Claims, 10 Drawing Sheets

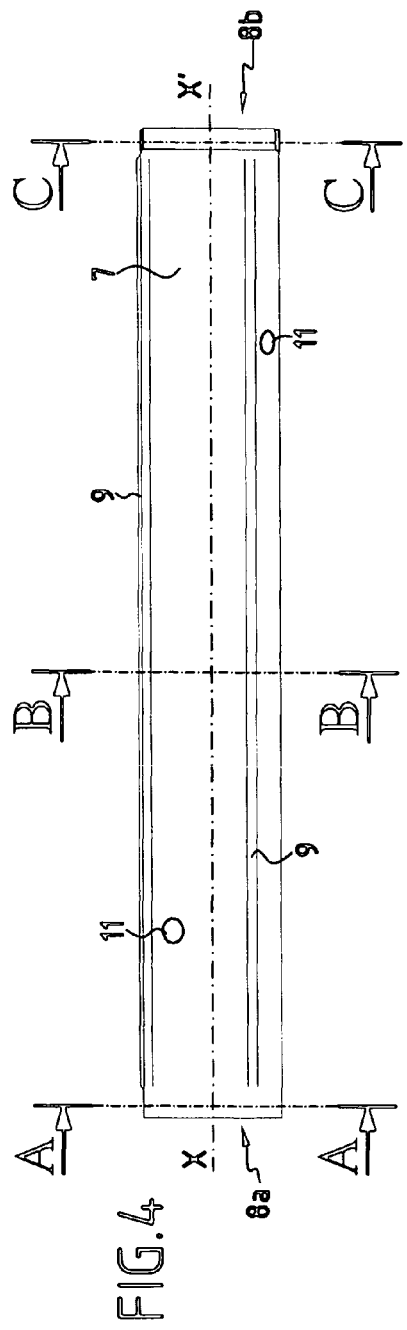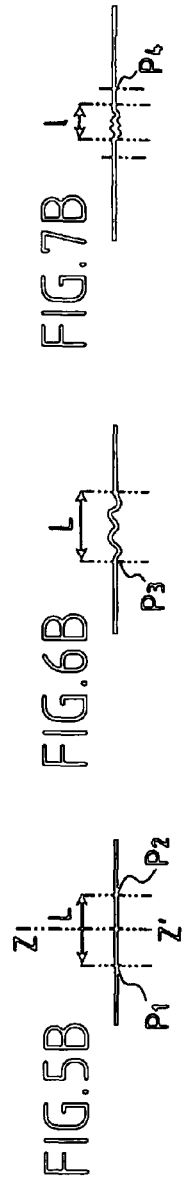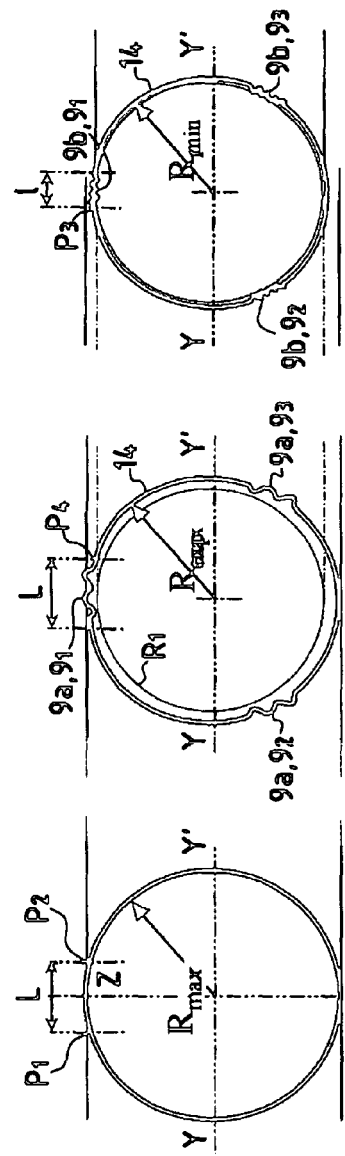
FIG.4
FIG.5B    FIG.6B    FIG.7B
FIG.5A    FIG.6A    FIG.7A

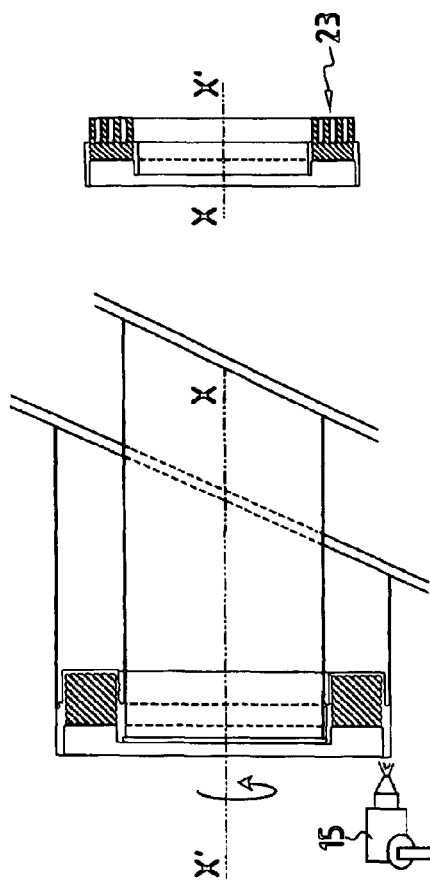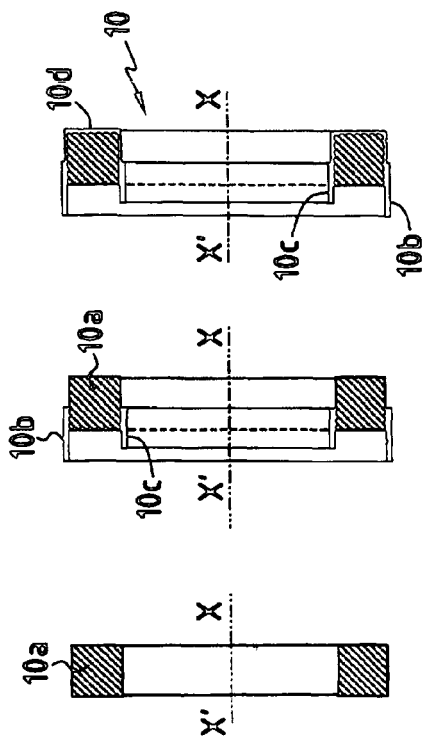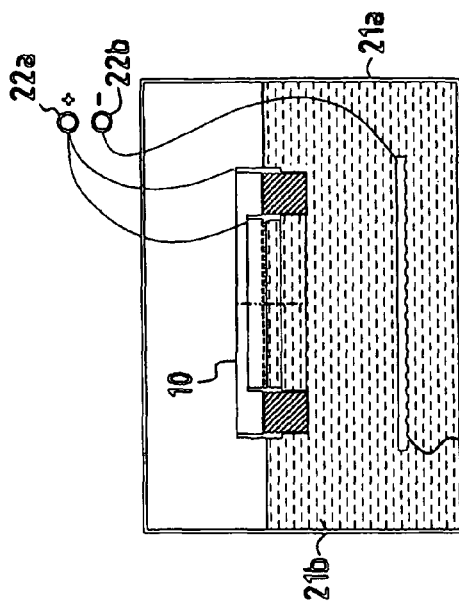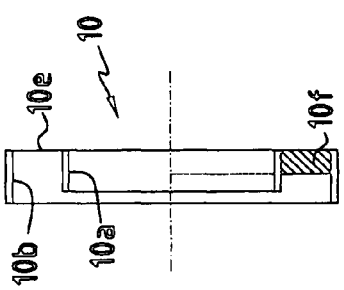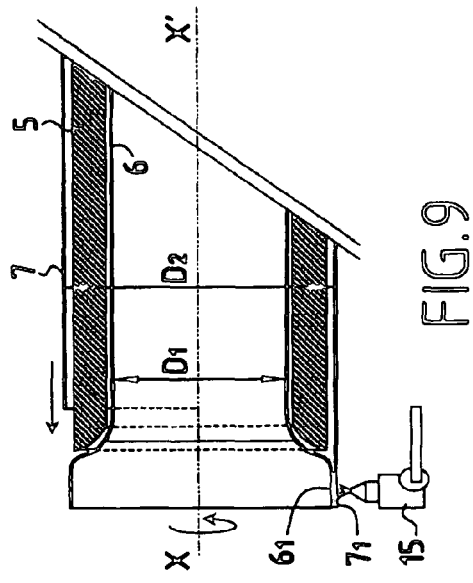

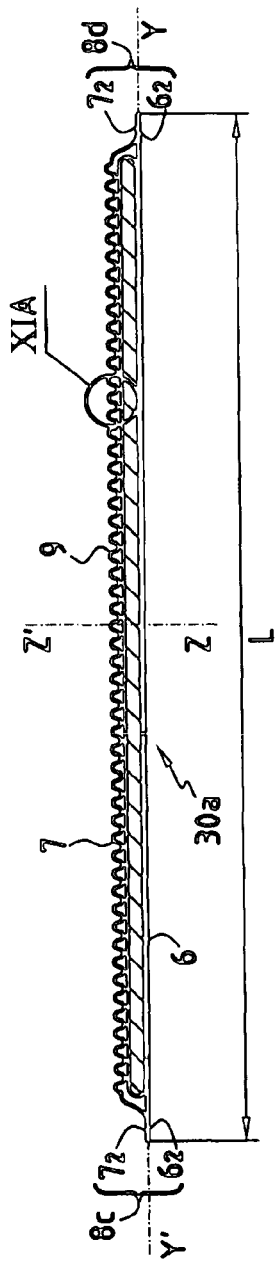
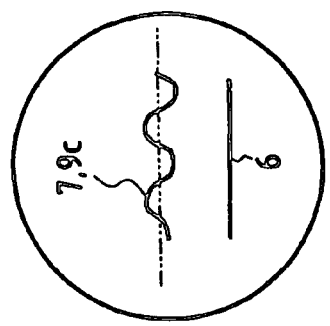
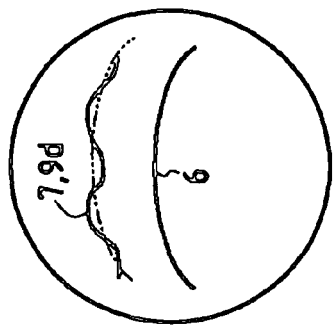
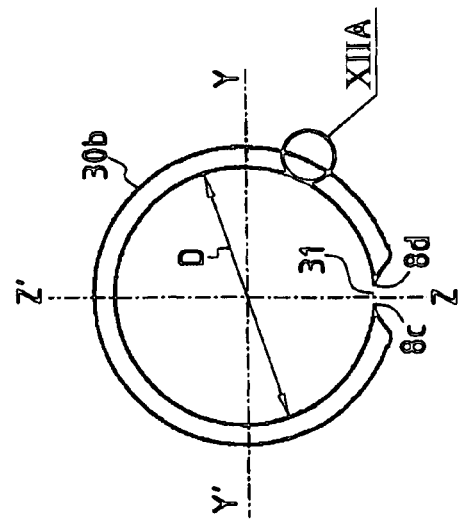

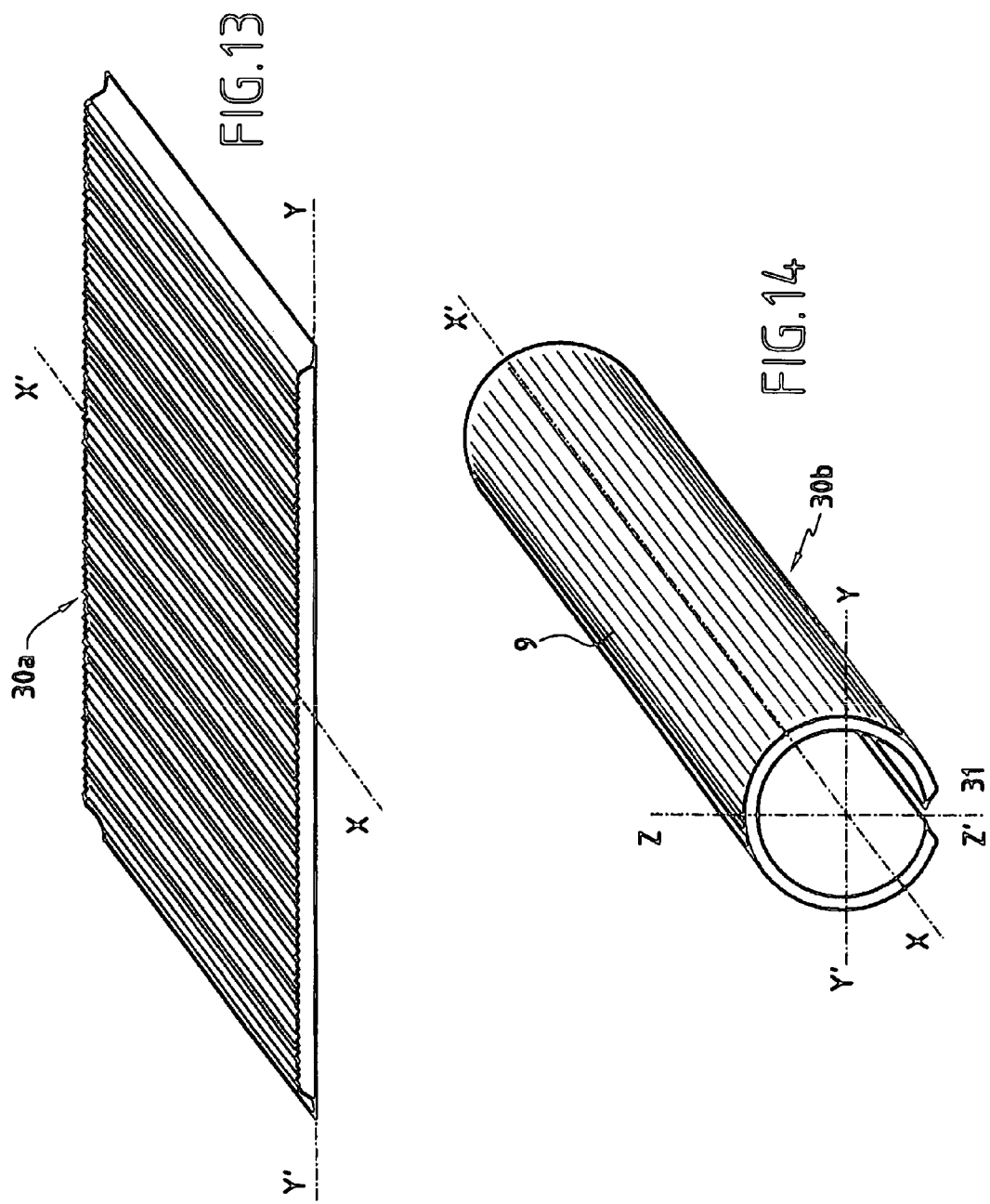

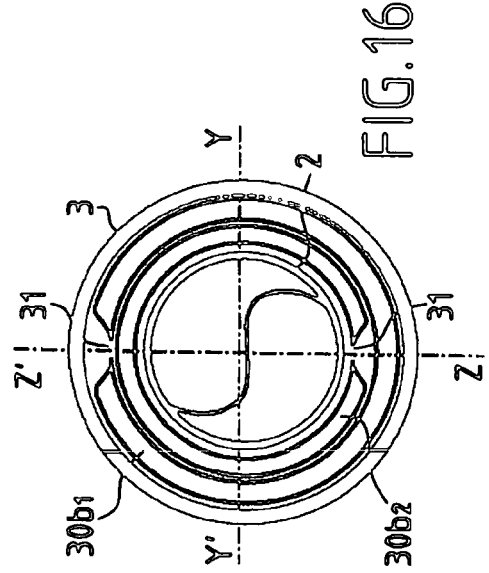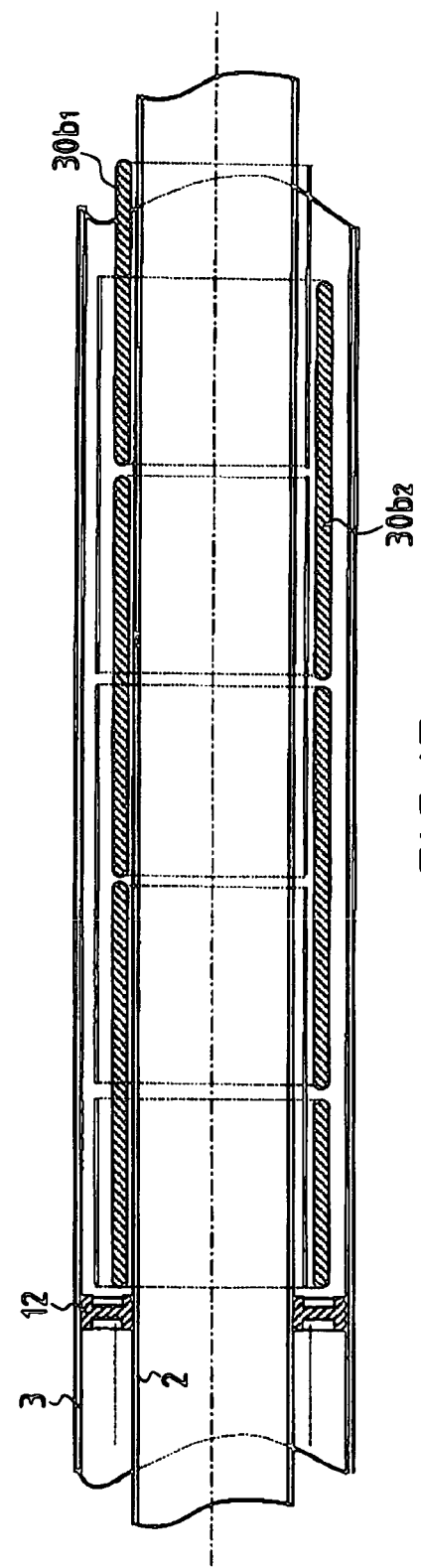

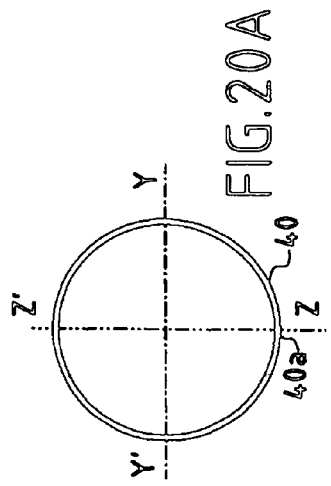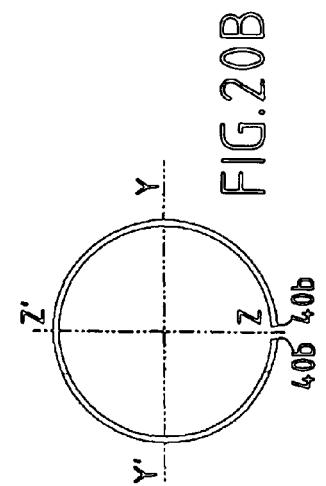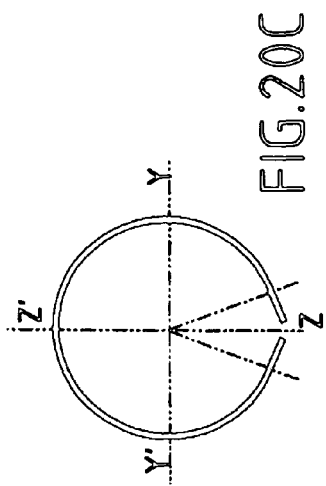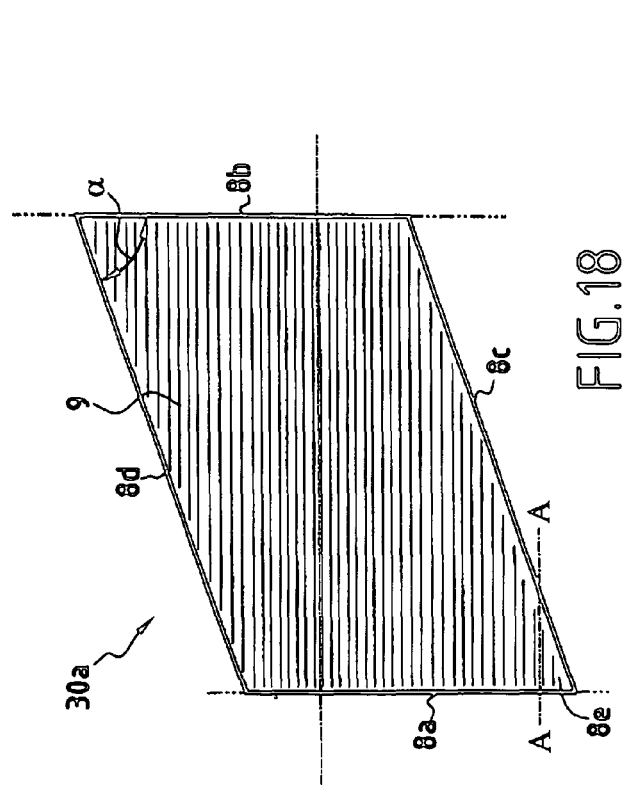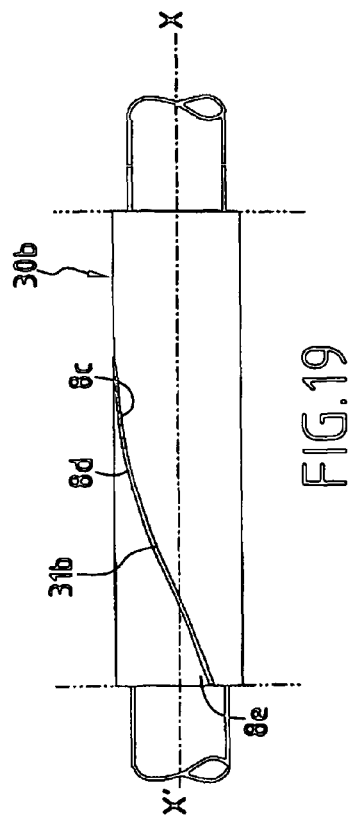

METAL-CLAD INSULATING COMPLEX FOR A PIPE

PRIORITY CLAIM

This is a U.S. national stage of application Ser. No. PCT/FR2005/001067, filed on 29 Apr. 2005. Priority is claimed on the following application(s): Country: France, Application No.: 04/04966, Filed: 7 May 2004; the content of which is incorporated here by reference.

FIELD OF THE INVENTION

The present invention relates to an insulating complex for any type of pipe and in particular for undersea pipes conveying hot or cold fluids. The present invention relates more particularly to an insulating complex suitable for being placed in the gap between two coaxial pipes comprising an inner pipe and an outer pipe, and preferably undersea pipes for use at great depths.

BACKGROUND OF THE INVENTION

The present invention relates in particular to insulating undersea pipes installed in oil fields at very great depths, and also to pipes suspended between the sea bottom and a surface vessel anchored over such an oil field.

The invention can also be applied in the field of the aviation and space industries where the concept of weight is of extreme importance.

In most industrial fields, it is desired to have insulation systems that provide good performance in order to ensure that fluids conveyed in pipes are maintained at constant temperature so that transfers between pieces of equipment can be undertaken over long distances, e.g. reaching several hundreds of meters or even several kilometers. Such distances are commonplace in plant such as oil refineries, liquefied natural gas installations (−165° C.), and off-shore oil fields which extend over several tens of kilometers. Such oil fields are being developed in ever-increasing depths of water, and such depths can exceed 3000 meters (m).

Numerous systems have been developed to reach a high level of thermal performance, and specific versions have been developed for being more suitable for use in great depths, i.e. for withstanding pressure at the sea bottom. Water pressure is substantially equal to 1 bar for a depth of 10 m, so the pressure that the pipe needs to withstand is then about 100 bars for a depth of 1000 m and about 300 bars for 3000 m.

The technologies presenting the greatest performance that have been developed for achieving this object are so-called "pipe in pipe" (PIP) technologies in which an inner pipe conveys the fluid and an outer pipe coaxial about the inner pipe is in contact with the surrounding medium, i.e. water. The annular gap between the two pipes is filled with an insulating material, or else is evacuated of all gas.

When using an insulating material of the polyurethane foam type under a gaseous atmosphere, the thicknesses required are generally considerable, e.g. 5 centimeters (cm) or 10 cm, which makes it necessary to use an outer pipe of large diameter. However, the outer pipe must withstand the pressure at the sea bottom without imploding, which requires the steel to be of extra thickness in order to withstand the pressure, and of extra area because of the increase in diameter. Furthermore, the annular gap filled with foam creates additional buoyancy that often needs to be compensated by increasing the weight of the pipe, and this is often done by increasing the thickness of the outer pipe. Thus, very often, the dimensioning of the outer pipe is governed by the requirements for the PIP assembly to be non-buoyant, rather than by the need for it to withstand sea bottom pressure.

In order to mitigate that drawback, technologies have been developed that provide much greater performance, in which it is desired to minimize the size of the annular gap between the pipes, in particular with a vacuum being established in the interstitial zone. The vacuum as created in this way then constitutes an excellent insulator, and an annular space of 5 millimeters (mm) to 10 mm then suffices. A PIP is then comparable in terms of performance to a "thermos flask" made of glass and of the kind in everyday use. In order to improve insulation, radiation is also limited by wrapping the outer portion of the inner pipe in a reflective film, generally constituted by a film of aluminum, possibly in association with thermoplastic materials.

Pipes are then prefabricated in unit lengths of 6 m to 12 m, and then they are laid after being assembled to one another in order to constitute a continuous connection. In the event of one or more segments of PIP being damaged, thermal bridges arise which, so long as they are limited in number and occupy small spots only, do not have significant repercussions on the behavior of the pipe which generally continues to perform its function over time.

Pipes made in this way using PIP technology based on a high vacuum nevertheless present the following drawbacks. The fluid coming from the offshore well is a mixture of crude oil, water, gas, and a variety of aggressive compounds such as $CO_2$ and $H_2S$. The inner pipe, which is generally made of carbon steel, is subjected to corrosion phenomena due to the fluid and having the consequence of producing atomic hydrogen $H^+$, which then tends to migrate in atomic form through the iron and carbon matrix of the steel so as to recombine on the outer wall of the inner pipe, i.e. in the annular gap between the two coaxial pipes, where it forms hydrogen gas of formula $H_2$. The vacuum created in this annular gap then degrades as the pressure of hydrogen increases, and hydrogen is an excellent conductor of heat, which goes against the intended purpose.

Various means have been developed to mitigate that drawback. One known means consists in introducing in the annular gap a compound that is known as a "getter", having the function of absorbing said gaseous hydrogen in order to keep the hydrogen partial pressure as low as possible, and thus maintain a desirable level of vacuum throughout the lifetime of the oil field, which can exceed 20 years. The getter is inserted during fabrication of the PIP and prior to final sealing, after evacuating.

Proposals have also been made for the inner pipe at least to be made of corrosion-resistant steel, such as stainless steel or duplex steel, however pipes are then extremely expensive and generally do not constitute a solution that is acceptable, economically speaking.

It is also commonplace to cover the inside of the pipe in a protective film, e.g. of the epoxy type, having the function of avoiding contact between the aggressive agents and the carbon steel. Nevertheless, where pipe segments are end-joined together on site, the welding process locally destroys said protection and creates zones that are subject to corrosion. In addition, in the event of the covering being damaged by cleaning tools being passed along the pipe or indeed by abrasion due to sand being conveyed together with the effluent, the surface runs the risk of degrading over time and the phenomenon of migration of atomic hydrogen amplifies over time.

Also known is the technology that has been developed in particular in the field of household appliances that is based on making flat panels out of a porous insulating material confined in a case constituted by a film, and generally heat-sealed at its ends, with a high vacuum being established inside the case prior to final sealing, i.e. a vacuum of the order of 1 millibar or less. The film is generally a multilayer laminate including a barrier that is generally constituted by a continuous aluminum film associated by adhesive or bonding with thermoplastic films, which films serve to allow the assembly to be heat-sealed. Such films are commonly used in the food industry for conserving produce such as milk, fruit juice, and coffee in a neutral atmosphere or in a vacuum.

That of insulation provides good performance since it limits heat transfer by conduction, convection, and radiation and serves to create reflective screens having the function of reflecting energetic radiation. Conduction is limited by depleting the molecules present or by trapping them within a cavity structure inside the porous insulating material, which material is preferably nano-porous. Such porous and nano-porous insulating materials are well known and are described below.

WO 01/38779 in the name of the Applicant describes an insulating tubular complex suitable for being placed around a pipe, and more particularly in the gap between two coaxial pipes comprising an inner pipe and an outer pipe, preferably undersea pipes for use in great depths, the complex being characterized in that it comprises:

a flexible case, and an insulating material confined in a vacuum between the inner wall and the outer wall of said case, said insulating material being preformed in the shape of a rigid tube;

each of said walls being constituted by a flexible multilayer film comprising at least one very thin metal film acting as a molecular sealing barrier, associated with thermoplastic films providing the case with strength and the ability to be heat-sealed.

In practice, the metal film is as thin as possible in order to avoid thermal bridges at the longitudinal ends of the case, i.e. the film is less than 10 micrometers ($\mu$m) thick.

Said nano-porous insulating material is in the form of a tube.

The opposite ends in the longitudinal direction XX' of said pipe and of said tubular complexes are each constituted by the respective edges of said inner and outer walls of said tubular complex, which edges are sealed together, preferably by adhesive or by heat-sealing.

That configuration is particularly advantageous, since the tubular configuration does not present any discontinuity in the circular radial direction, and the only discontinuities in the insulation are situated at each of the longitudinal ends of said tubular case.

In that patent WO 01/38779 there is described more particularly the manner in which the cylindrical cases are prepared, and in particular the manner in which assembly and welding is performed at the ends of the inner and outer walls by creating folds for the purpose of accommodating the differences in the developed sizes of the inner wall and the outer wall of the case.

In a first embodiment, folds are created in the end edges of the outer wall. In a second embodiment, it is the inner wall that has folds in its central zone in contact with said pipe between the opposite ends of the complex in the longitudinal direction. These folds also serve to deal with the reduction in the diameter of the cylindrical outer wall when the case is evacuated, without any risk of the case becoming leaky. The folds do not present any drawback, since in a case made up of a multilayer film of flexible thermoplastic material and given the flexibility of said case, the folds naturally flatten down one on another without leading to significant extra thickness or even to a zone that is unstable in shape, and the case remains practically circular in overall shape.

The insulating tubular complexes described in WO 01/38779 nevertheless suffer from two main drawbacks:

they must necessarily be prepared in tubular form, which represents a relatively large amount of bulk and leads to difficulties in transportation if they are not fabricated on their site of use, since they are extremely fragile, and in the event of an impact or being punctured merely by a hole or a pin, the tubular complex ceases to be effective;

secondly, the properties of the multilayer thermoplastic films used do not guarantee that a vacuum can be maintained over a lifetime in excess of 20 years, because gas migrates through the multilayer case and through the seals between the thermoplastic materials, even if it does so at a very low rate; and finally, the ability of multilayer thermoplastic films to withstand high temperatures is very limited, and they cannot be used at temperatures in the range 150° C. to 200° C. as are encountered in certain oil fields.

Also known are plane panels confined in cases made of metal strips, made of steel, in particular stainless steel, or aluminum, and welded in leaktight manner over their entire periphery, thus presenting a lifetime that is much longer than that of plane panels having thermoplastic cases of the above-described type, since the migration of gas molecules through weld zones is practically zero when the case is made of metal, thus making it possible to achieve lifetimes in excess of 50 years. Patent EP-0 857 833 describes a method of fabricating such a panel in a plane rectangular configuration.

When using plane insulating panels made from metal strips of the kind described in patent EP-0 857 833, it is practically impossible to bend such a panel in order to obtain a circular shape, because of the rigidity of said strip, and also because of the fragility of the wall constituting its edge, since it is constituted by a strip of very small thickness (a few hundredths of a millimeter), in order to minimize thermal bridges between the outer face and the inner face of the evacuated insulating complex.

Similarly, when it is desired to replace the thermoplastic multilayer cases of the insulating tubular complexes of WO 01/38779 with metal strip, even if it is very thin, the local rigidity of said strip remains high so that during evacuation the outer case collapses and presses against the insulating material, leading to buckling similar to that which occurs in a thin steel or aluminum beer can when it is compressed radially by hand. This leads to localized bumps being formed, giving rise not only to points of weakness, but also, and randomly, to a shape that is locally non-circular, presenting more or less sharp angles, which shape may be inscribed in a circle of diameter greater than the nominal diameter of the outer case at rest, thus running the risk locally of interfering with the inside face of the outer pipe of the PIP.

Thus, the problem posed is to provide an insulating complex comprising a nano-porous insulating material confined under a vacuum in a case suitable for being put into place in tubular shape around a pipe, and capable of being used in a wide variety of applications and more particularly for insulating undersea pipes immersed at great depths, and thus satisfying the conditions that are to be encountered when developing oil fields in deep water.

More particularly, the problem posed is that of providing an insulating complex presenting properties and performance that are improved compared with those of the prior art, in particular in terms of mechanical strength, ability to withstand high temperatures, which can reach 150° C. to 200° C. or even more, and a lifetime for the thermal insulation properties that is of the order of 50 years or more, capable of being certified or of satisfying administrative regulations.

Another object of the present invention is to provide an insulating complex capable of being prepared in substantially plane form and suitable for being evacuated, and subsequently bent so as to obtain a circular tubular shape without leading to damaging deformation, whether in terms of the case leaking, or in terms of the pipe in which the case is inserted being damaged, in particular due to said circular shape being deformed by kinking or by ovalization.

SUMMARY OF THE INVENTION

The thermal insulation requirements of the present invention are as follows:
- very high performance insulation corresponding to a heat transfer coefficient having values of the order of a few milliwatts;
- insulation that is compact so as to be capable of being received in small confined spaces (as applies to the aerospace, aviation, and oil industries whether offshore or on-shore);
- thermal insulation that is very light so as to avoid disturbing and/or weighing down the primary structure that is to be insulated (the insulation should not lead to forces and stresses falling outside standards);
- the thermal insulation should be easy to use and adaptable to pipes of any shape; and
- the thermal insulation should cover a wide range of temperatures from very low temperatures (−150° C. or less) up to high temperatures lying in the range 150° C. to 200° C., or more.

To do this, the present invention provides an insulating complex suitable for being placed around a pipe of longitudinal axis XX', preferably an undersea pipe for great depths, the complex comprising insulating material confined in a partial vacuum in a case, said case comprising an inner wall and an outer wall, and the complex being characterized in that:
- said inner and outer walls are made of rectangular or parallelogram-shaped metal strips, each having two parallel opposite end edges and two parallel opposite longitudinal edges; and
- said inner and outer walls are sealed to each other, at least at said respective end edges defining the opposite ends of said complex in said longitudinal direction after the complex has been put into place around said pipe, said end edges preferably extending in a transverse plane perpendicular to said longitudinal direction; and
- the two said longitudinal edges of each wall are either sealed to each other or are sealed to the longitudinal edges of the other wall; and
- at least one of said inner and outer walls, preferably said outer wall, includes at least one corrugated zone having transverse corrugations extending in the longitudinal direction between said opposite ends of said complex in the longitudinal direction XX'.

The inner wall corresponds to the wall of the case placed against the pipe, in particular the inner pipe for a tubular complex that is placed in the gap between two coaxial pipes. Similarly, the outer wall corresponds to the case wall that is placed on the other side of said insulating material, on its free outer face or against the inside face of the outer pipe when the tubular complex is placed in the gap between two coaxial pipes.

It will thus be understood that the case is constituted solely by metal strips, which present "semi-rigid" characteristics, i.e. they can be deformed but are capable of staying in shape on their own once they have been shaped, like a beer can or a food tin or can.

The term "wall constituted from a rectangular or parallelogram-shaped metal strip" means that the plane developed surface of the strip constituting said wall is rectangular or parallelogram-shaped.

It will be understood that the end edges of the walls and of the complex are edges at each end in the longitudinal direction when the complex is put into place around the pipe.

The term "longitudinal edges" is used to mean the edges which, for rectangular strips, extend in the axial longitudinal direction of the complex after it has been put into place around the pipe, or for a parallelogram-shaped strip, the edges that define a helical bend about the axis extending in said axial longitudinal direction of the complex after being put into place around the pipe.

These "longitudinal edges" are preferably longer than said end edges.

The edges of said walls are sealed together, preferably by adhesive or by welding.

The term "longitudinal edges of each wall sealed together" means that the two longitudinal edges of the inner wall are sealed to each other and the two longitudinal edges of the outer wall are sealed to each other.

The term "longitudinal edges of each wall sealed to the edges of the other wall" means that the two parallel opposite longitudinal edges of the inner wall are sealed to the two respective parallel opposite longitudinal edges of the outer wall.

The term "transverse corrugation extending in the longitudinal direction" means that the wall has fluting extending longitudinally and that the outline of the cross-section forms indentations and projections, or waves, on traveling along the wall in a direction perpendicular to the longitudinal direction, such that:
- the distance between said inner and outer walls of the case in a direction perpendicular to said longitudinal direction varies; and
- the distance between said inner and outer walls of the case in said longitudinal direction is substantially constant between said opposite ends, except in transition zones between said sealed opposite ends of the complex and the ends of the corrugations in said longitudinal direction.

These corrugations provide a stretching reserve for the outer wall relative to the inner wall, or respectively, where appropriate, a shrinking reserve for the inner wall relative to the outer wall, thus making it possible:
- firstly to put said complexes when pressed against a pipe, or when threaded around a pipe, into a cylindrical or tubular shape, the amplitude or height of the corrugations in the outer wall flattening out after shaping and serving to constitute a stretching reserve needed by the outer wall, or conversely the height or amplitude of the corrugations in the inner wall increasing after shaping and serving to constitute a shrinking reserve needed by the inner wall; and
- secondly these corrugations make it possible to evacuate the case partially while controlling deformation of the corrugated wall by flattening and thus shrinking said corrugations, i.e. reducing the wavelength or width of a corrugation, and respectively increasing the amplitude or height of the corrugations.

It will thus be understood that the corrugations are preformed prior to bending and it is these corrugations that make it possible to accommodate dimensional changes of one of the walls by shrinking or stretching the corrugations when the walls are placed one above the other around a cylindrical pipe.

In general, and preferably, the metal strips of said outer and inner walls, at least one of which is corrugated, can be inscribed in rectangles of the same dimensions, so the width of the corrugated strip after being developed flat (i.e. after flattening out the corrugations) would therefore be greater than the width of the other wall that does not have corrugations and after it has been flattened out.

The geometrical characteristics of said corrugations depend on numerous factors, such as the diameter of said tubular shape, the thickness of the insulating material, and the thickness and the mechanical quality of the metal strip in terms of breaking elongation, and they are described in greater detail in the description of the invention.

By way of indication, the corrugations preferably have a radius of curvature corresponding to 10 times or 100 times, and preferably 20 times to 50 times the thickness of said strip, which corresponds to a corrugation in the shrunk position having an amplitude that is substantially twice said radius, and in the stretched position having an amplitude lying in the range 40% to 80% said radius.

These corrugations can be created by stamping the metal sheet using techniques known to the person skilled in the art, or by knurling, in the manner used when making corrugated sheets.

More particularly, said metal strips are made of stainless steel or of aluminum, and they are preferably of thickness lying in the range 0.05 mm to 0.5 mm.

More particularly, said insulating material presents a thickness of 5 mm to 75 mm, and preferably of 10 mm to 50 mm.

To achieve the performance required in the present invention, it is necessary for the thermal insulation to prevent convection. Several types of rigid or flexible nano-porous insulating materials exist that are known and capable of achieving this effect.

Advantageously, said insulating material is a nano-porous material obtained from the following materials known to the person skilled in the art:

- inorganic materials in powder, granule, or woven or non-woven fiber form, in particular based on minerals selected from silica, alumina, or perlite, or respectively based on glass fibers or ceramic fibers; and
- open-celled organic materials, preferably polyurethane foam; and
- combined organic and inorganic materials, such as polyurethane foam reinforced by fibers or composite materials.

In an embodiment, the insulating material inside said case is a nano-material, in particular an aerogel, preferably an aerogel of silica or of titanium oxide. In another embodiment, the nano-porous insulating material is a foam of nano-porous syntactic material.

One of them is a polyurethane foam having open cells. In this type of nano-porous material, convection is blocked since the mean free path of gas molecules is of the same order of magnitude as the size of the open cells, i.e. a few nanometers, and the molecules are therefore trapped locally.

It is preferred to use insulating materials that are rigid or semi-rigid in order to make circular tubular shapes directly. For panels of plane shapes that are to be bent in order to obtain a circular tubular shape, it is preferred to use semi-rigid insulating materials or materials in powder, granule, or bulk form when using glass fibers of medium to short length.

It is desirable to obtain extremely high levels of insulation, i.e. values U for the overall heat transfer coefficient referred to the inside diameter of the inner pipe that are less than or equal to 0.5 watts per square meter kelvin ($W/m^2K$), and in order to improve the performance of such base materials, it is important to evacuate the case of the gas it contains, generally air, so as to minimize heat exchange by contact. The level of vacuum required depends on the insulating material in question. Thus, when using glass fibers, the vacuum must be very high, so the absolute pressure needs to be about 10 pascals (Pa).

For polyurethane foam, the absolute pressure must be less than 500 Pa, and preferably lies in the range 100 Pa to 500 Pa.

For compacted silica, the absolute pressure must be less than 5000 Pa, and preferably lies in the range 2500 Pa to 5000 Pa.

With aerogels, the absolute pressure must be less than 10,000 Pa, which represents a medium vacuum. It can thus be seen that for unsophisticated materials, such as glass fiber, the level of vacuum that is required is very high, whereas for aerogels, which are expensive, the level of vacuum is much less constraining. The type of insulation that is selected thus depends on a combination of technical and economic criteria, and can vary with the diameters of the pipes and the thicknesses of material that are required, which have a considerable influence on the volume and thus on the cost of supplies, while the method of evacuating the case and of sealing it remains substantially the same. For a high vacuum, it is advantageous to include a getter within the insulating material so that said getter absorbs the molecules trapped on the surface of said materials and thus maintains the desired level of vacuum. In addition, the presence of a getter presents the advantage of continuing to evacuate residual gas molecules after the case has been finally sealed, by absorbing said molecules, with this phenomenon continuing for several weeks, or even several months depending on internal porosity, and commonly enables the level of vacuum to be improved by 10% to 30%.

In a first variant embodiment of a complex of the invention, said two parallel opposite longitudinal edges of each wall are sealed together and said insulating complex is of substantially tubular shape, such that:

- each of said opposite ends of the complex presents a shape that is defined by cylindrical surfaces of circular section of axis corresponding to said longitudinal direction XX' of said end edges of each of said inner and outer walls; and
- said corrugated zone between said opposite ends is defined by a cylindrical surface of longitudinal axis XX', of cross-section, that is partially circular, including said corrugations, preferably in the outer wall; and
- the other wall, preferably said inner wall, is defined by a cylindrical surface having a cross-section that is circular without any corrugations.

Preferably, in this first variant embodiment, said corrugated zone(s) occupy only a fraction of the periphery of the wall, preferably the outer wall, and are spaced apart and distributed symmetrically and regularly along the perimeter of said partially circular cross-section, preferably in at least three corrugated zones that are preferably uniformly distributed around the circumference, i.e. disposed at substantially 120° intervals.

In this embodiment, the corrugations then occupy limited zones only, that are spaced apart from one another around the perimeter of the cross-section of the wall.

Preferably, in this first variant embodiment, each of said inner and outer walls is obtained from a rectangular metal strip, said two parallel opposite longitudinal edges of each of said walls being end-joined against the other to form a said insulating tubular complex.

The "longitudinal edges" in this variant are the longer edges extending in said axial longitudinal direction of the resulting insulating tubular complex.

Also, preferably, the face of one of said longitudinal edges that faces towards the inside of the case is end-joined against the face of the opposite other one of said longitudinal edges that faces towards the outside of the case.

This first variant embodiment is advantageous since it presents a level of insulation that is constant along the entire periphery of the insulating tubular complex, and as a result eliminates any longitudinal thermal bridge along a generator line.

In an embodiment, said opposite ends of the complex are constituted by the faces inside the case of said respective end edges in said longitudinal direction XX' of each of said inner and outer walls that are sealed directly one against the other, preferably by adhesive or by welding.

More particularly, said opposite ends in the longitudinal direction XX' of said complex formed by the respective edges of said inner and outer walls form a cylindrical surface of diameter substantially equal to the outside diameter of the insulating material that is of substantially tubular shape and confined inside said case.

It will be understood that in order to do this, said opposite end edges in the longitudinal direction of said inner wall must flare, becoming radially larger on approaching said ends in order to join the cylindrical inner surfaces of said end edges of said outer wall. This flaring can be obtained by a method described below.

In another embodiment of this first variant, said opposite ends of the complex are constituted by the inside faces of the case of said respective end edges in said longitudinal direction XX', that are sealed by adhesive, or preferably by welding, against a connection device of annular shape comprising a main body of rigid insulating material, preferably a composite material or a syntactic foam of annular shape, which main body has an inner cylindrical face preferably covered by a first metal ferrule to which the face inside the case of said end edge of the inner wall is sealed, or preferably welded, and an outer cylindrical face that is preferably covered in a second metal ferrule, to which the inside face of said end edge of the outer wall is sealed, or preferably welded.

In a second variant embodiment of an insulating complex of the invention, said two longitudinal edges of each wall are sealed to the respective longitudinal edges of the other wall so as to form the longitudinal edges of said complex, said parallel opposite longitudinal edges of said complex not being end-joined one against the other when said complex is bent or wound around said pipe.

In a first embodiment of said second variant, said parallel opposite longitudinal edges of said complex are moved towards each other when said complex is bent to form a layer, or they are spiral-wound to form a layer, occupying a plurality of turns around said pipe so as to cover the pipe and form an open tubular structure of longitudinal axis XX' and presenting a discontinuity between the said two longitudinal edges of the complex.

In a second embodiment of this second variant, said complex is rolled onto itself to form a plurality of superposed layers around the pipe and using the same piece of complex, thus avoiding any discontinuity of insulation between said two longitudinal edges of said complex.

It will be understood that this bending or this winding of the complex is performed, starting with a complex in a substantially plane configuration.

The term "complex in a substantially plane configuration" is used herein to mean that the wall without any corrugations, preferably the inner wall, is a wall suitable for adopting a substantially plane configuration prior to bending and placing around a said pipe, and the other wall, preferably said outer wall, is suitable for adopting a configuration in which the tops of said corrugations lie substantially In a common tangential plane.

Said discontinuity of the open tubular structure is a discontinuity that is peripheral in cross-section, but, in addition, a discontinuity in said longitudinal direction, in particular when said complex is wound as a plurality of turns and is not merely bent.

The term "cross-section" is used to mean a section in a plane perpendicular to said longitudinal axial direction XX'.

Preferably, in this second variant embodiment, said corrugated zone covers substantially the entire width of said wall in the transverse direction, preferably said outer wall, when said complex is in the substantially plane developed configuration.

It will thus be understood that when said complex forms a said discontinuous tubular structure, said corrugated zone covers substantially the entire periphery of the wall, i.e. substantially the entire perimeter of the cross-section of the wall, naturally with the exception of the zone of discontinuity in said tubular structure, and also with the exception of the transition zones between firstly the corrugated zone itself and secondly said end edges and said longitudinal edges of said corrugated wall.

In a particular embodiment of this second variant, said opposite ends of the complex in said longitudinal direction XX' are constituted by the faces inside the case of said respective end edges of each of said inner and outer walls sealed directly one against the other preferably by adhesive or by welding, and the longitudinal edges of said complex are constituted by the faces inside the case of said longitudinal edges of each of said inner and outer walls, sealed directly one against the other, preferably by adhesive or by welding.

More particularly, said inner and outer walls are rectangular in shape when said complex is in a plane developed configuration, and after said bending of said complex around a said pipe, said complex forms a said open tubular structure presenting a discontinuity along a generator line in said longitudinal direction XX'.

Still more particularly, said opposite ends in said longitudinal direction of said complex formed by the respective edges of said inner and outer walls form a cylindrical surface that is open along its generator line in said longitudinal direction, which cylindrical surface is of diameter substantially identical to the inside diameter of the insulating material that is of substantially tubular shape and confined inside said case.

In another embodiment of this second variant insulating complex of the invention, said end edges and longitudinal edges of said inner and outer walls define a parallelogram having an angle preferably lying in the range 15° to 60° when said complex is in said plane developed configuration, said parallelogram being adapted to be bent, or where appropriate, spiral-wound as a single layer occupying a plurality of turns around a said pipe, in order to form a said tubular structure presenting a discontinuity along a helical bend formed by the gap between said longitudinal edges of said complex, not end-joined one to the other after bending, and, where appropriate, winding said complex around the pipe.

The term "longitudinal edges" is used herein to mean the longer edges. These longer edges correspond to the end edges in a transverse direction perpendicular to said longitudinal direction XX' of the plane developed surface of said parallelogram-shaped metal strip. After being wound around the pipe to form a said tubular structure, said longitudinal edges of a parallelogram do not extend in said axial longitudinal direction XX' of the complex, but form a helix.

In this second variant, the insulation material must necessarily be deformable, i.e. flexible or semi-rigid, and it is advantageously constituted by a material in powder or granule form, or when using a powder material of the glass fiber type, in bulk, or it may be woven or non-woven.

The number of corrugations varies depending on whether the complex is in continuous tubular form in accordance with said first variant explained above, or whether the complex is obtained by bending or winding a plane panel in said second variant explained above.

In the first variant, the corrugations must absorb the extra circumferential length corresponding to the clearance that exists between said outer wall and the insulating material, which clearance is necessary to be able to engage said outer wall around the insulation, which corresponds to a variation in diameter $\delta D$ equal, for example, to 2 mm to 20 mm, and thus to an extra circumferential length $\delta C = \pi \times \delta D$, which corresponds to a theoretical value of $\delta C = 6.3$ mm to 63 mm, with each of the corrugations being capable of absorbing 0.5 mm to 2 mm depending on the radius of curvature of said corrugation.

In the second variant, the corrugations must be capable of providing extra circumferential length when the panel goes from a plane configuration to a bent configuration, the extra length needed is then a function solely of the thickness of the insulation. Thus, for insulation having thickness e equal to 40 mm, for example, the circumferential extra length needed will be $\delta C = 2 \times \pi \times e$, i.e. substantially $\delta C = 251$ mm, whereas if the thickness e of the insulation were, for example, equal to 12 mm, then the extra circumferential length needed would be only $\delta C = 75$ mm, which represents a smaller number of corrugations that should be distributed uniformly around the panel.

In both variant embodiments of the invention, said case advantageously has at least one closable orifice enabling the case to be partially evacuated, and preferably a plurality of closable orifices that are preferably situated in zones that do not have any corrugations, and more preferably in the outer wall.

It will be understood that such an orifice serves to co-operate with a vacuum pump that is adapted to evacuate the case, and then to be sealed by closure means, preferably welded or stuck thereto.

In the second variant of the invention, it will be understood that the closable orifices for evacuating the case could be made through the inner wall, but in the first variant they are advantageously made in non-corrugated zones of the outer wall.

The present invention also provides an insulated pipe, preferably an undersea pipe for use at great depths, characterized in that it includes individual tubular complexes placed around said pipe of the invention.

More particularly, said individual tubular complexes are disposed around the pipe contiguously one after another in said longitudinal direction XX', each having a length of 2 m to 10 m, and preferably of 3 m to 6 m.

The present invention also provides a set of two coaxial pipes comprising an inner pipe and an outer pipe having individual tubular complexes of the invention placed in the annular gap between said two pipes, said inner pipe, and preferably said outer pipe, comprising a said insulated pipe of the invention.

Advantageously, said outer and inner pipes are interconnected by centralizing mechanical links, preferably comprising parts made of plastics material, more preferably of elastomer, with the said ends of some of said tubular complexes coming into abutment against said parts.

Also advantageously, the pressure in the gap between said two pipes, outside the case, is less than 5 bars, and is preferably identical to atmospheric pressure.

Said evacuated insulating tubular complexes as made in this way are engaged one against another so as to build up an assembly presenting a minimum number of thermal bridges, said thermal bridges being situated at the connections between two insulating tubular complexes. For this purpose, the insulating tubular complexes of the invention are as long as possible, e.g. 6 m long, where their length is generally limited by problems of handling and the risk of the complexes being damaged while assembling the PIP.

Another limitation arises from the differential behavior of the inner pipe relative to the outer pipe. When the inner pipe is under pressure, it tends to lengthen due to the bottom effect. Similarly, variation in the temperature of said inner pipe increases its length. However the outer pipe remains at sea bottom pressure and at the temperature of the surrounding medium, which is generally around 4° C., so differential forces arise between the two pipes, thus implying that said mechanical links should be spaced apart all along the PIP, optionally in regularly spaced-apart manner. The space between two of said mechanical links is determined so as to avoid the compression stress generated within the wall of the inner pipe due to connection to the outer pipe preventing it from lengthening, which would lead to mechanical instability of the wall of the inner pipe, where such instability is known as "buckling". Under such circumstances, the space may be 6 m long in unfavorable circumstances or may reach 15 m to 20 m with inner pipes of large diameter, e.g. 14 inches (") to 20". The bottom effect and buckling are well known to the person skilled in the art of oil-carrying pipes and they are not described in detail herein.

Thus, the gap between two successive mechanical links is filled by one or more evacuated insulating tubes fitted to said mechanical links and at the junctions between each of the tubes, so as to limit thermal bridges to the vicinity of successive junctions.

Advantageously, said mechanical link is made of a material that is a poor conductor of heat and that provides a good compromise between mechanical performance and insulation performance. By way of example, such a mechanical link can be made in the form of a molded part of elastomer type or of thermoplastic type, or by using optionally-filled cured resins.

For an insulating complex of discontinuous tubular structure in accordance with the second variant embodiment of the invention, a set of two pipes of the invention comprises such insulating complexes preferably disposed one after another in said longitudinal direction XX' and also disposed one on another in such a manner that the outer insulating complex covers, where appropriate, the open zones constituted by the two longitudinal edges of a given complex that have been brought close together but not end-joined one against the other and belonging to said inner insulating complexes, and where appropriate also covers the open zones constituted by the end edges of two of said inner complexes disposed end to end in the axial direction.

Preferably, an outer insulating complex is disposed in such a manner as overlap two consecutive inner insulating complexes. This disposition makes it possible to eliminate thermal bridges in the longitudinal open zones of the inner complexes, insofar as the longitudinal open zone of the corresponding outer insulating complex is offset, preferably by 180°, relative to the corresponding open zone of said inner insulating complexes.

For a tubular complex in accordance with the first variant, its outside diameter must be 1 cm to 2 cm greater than the outside diameter of the inner pipe so as to make it possible to insert one in the other. Similarly, the inside diameter of the outer pipe must be 1 cm to 2 cm greater than the outside diameter of the insulating tubular complex in the first variant so as to be able to insert one in the other.

The second variant presents the advantage of making it possible to fabricate an insulating tubular complex that exactly matches the outside diameter of the inner pipe, thus making it possible to reduce correspondingly the diameter of the outer pipe, and thus its weight and its cost. However the second variant requires two panels to be fabricated that are installed opposite ways round, one on the other, in order to eliminate thermal bridges along longitudinal generator lines, and that represents a significant extra cost in terms of the area of metal strip that is required since it is substantially doubled. However, for a product that is manufactured in a factory and then transported flat to an assembly site where it is bent around the inner pipe, the complex is merely stored flat in containers that can be filled completely, whereas with insulating complexes that are tubular in shape in accordance with the first variant need to be stored on supports that prevent them from becoming oval or being damaged, and thus represent considerable volumes, 5 to 10 times greater, and thus requiring 5 to 10 times more containers for transport purposes. Thus each of the two alternatives presents its own advantages and making a selection between them will depend on multiple technical and economic factors, as mentioned above.

The present invention also provides a method of fabricating an insulated pipe or a set of two coaxial pipes of the invention, the method being characterized by the following steps:

a closed tubular complex is preformed in accordance with said first variant embodiment of said complexes of the invention; and said tubular complex is engaged around a said pipe or respectively in the internal annular gap in a set of two coaxial pipes.

The present invention also provides a method of fabricating an insulated pipe or a set of two coaxial pipes of the invention, the method comprising the steps of:

making an insulating complex in the plane developed configuration in accordance with said second variant embodiment of the invention; and forming the insulating complex by bending or winding said complex onto a said pipe, or where appropriate the inner pipe of a set of two coaxial pipes of the invention.

The invention also provides a method of fabricating an insulating complex of the invention, characterized by the following steps:

1) applying said insulating material on a first metal strip constituting said inner wall, itself applied on a tubular mandrel or on a plane surface; then 2) covering said insulating material with a second metal strip that has corrugations and that constitutes said outer case wall; and then 3) making said opposite ends of said complex by sealing said respective end edges of said outer and inner walls together.

BRIEF DESCRIPTION OF THE DRAWINGS

Other characteristics and advantages of the present invention appear in the light of the following detailed description given with reference to the following figures, in which:

FIG. 4 is a side view of an outer wall of the case having transverse corrugations occupying a fraction of its length and distributed in a plurality of circumferential zones of said case;

FIGS. 5A-5B are sections on plane AA of FIG. 4 showing the outer wall respectively in a circular configuration (5A) and in a plane developed configuration (5B);

FIGS. 6A-6B and 7A-7B are sections relating to plane BB of FIG. 4 showing the corrugating outer wall respectively in a circular configuration (6A-7A) and in a plane developed configuration (6B-7B) respectively before evacuating (6A-6B) and after evacuating (7A-7B);

FIG. 9 is a side view in section showing an embodiment of the leaktight junction between the inner and outer walls, in which the inner case is deformed by being expanded so as to reach the diameter of the outer case;

FIGS. 10A to 10F are side views in section of a preferred way of fabricating a case end in the longitudinal direction including a fitting 10 serving to make the leaktight junction between the inner and outer walls;

FIG. 10G is a side view in section of another embodiment of a said fitting 10;

FIG. 11 is a cross-section view of a panel type insulating complex, i.e. comprising an insulating material in the form of a plane panel with a case presenting corrugations (9) in its outer wall;

FIG. 12 is a cross-section view of the FIG. 11 insulating complex, after it has been bent so as to obtain a circular shape that is open at the bottom;

FIGS. 11A and 12A are sections relating to FIGS. 11 and 12 showing in detail how the corrugations in the outer corrugated wall are deformed on going from the plane configuration of FIG. 11 to the bent configuration of FIG. 12, the inner wall passing from a plane configuration to a configuration that is substantially circular;

FIGS. 13 and 14 are perspective views of a plane panel type insulating complex having a corrugated case, respectively in a plane configuration (FIG. 13) and in a substantially circular configuration after bending (FIG. 14);

FIG. 16 is a section of a PIP made up of two panels bent into a circular configuration as shown in FIG. 14 and installed opposite ways round between an inner pipe and an outer pipe;

FIG. 17 is a section in the longitudinal direction on plane (ZZ', XX') corresponding to FIG. 16, showing in detail the two layers of circular panels installed opposite ways round and presenting a longitudinal offset;

FIG. 18 is a plan view of a plane panel that is parallelogram-shaped;

FIG. 19 is a side view of an inner pipe around which the plane parallelogram-shaped panel of FIG. 18 has been bent (wound through one turn);

FIGS. 20A and 20B show various stages in making a tube from a bent plane sheet, the tube being prepared with rounding in FIG. 20B for subsequently giving rise to a longitudinal weld having the shape shown in FIG. 20A;

FIG. 20C shows preparation of a tube without rounding, prior to longitudinal welding.

DETAILED DESCRIPTION OF THE PRESENTLY PREFERRED EMBODIMENTS

FIGS. 1 to 10 show a first embodiment of the invention in which an insulating closed tubular complex of the invention is made and said tubular complex is then threaded around a pipe, or alternatively in the internal annular space between two pipes in a set of two coaxial pipes.

Figure 1:
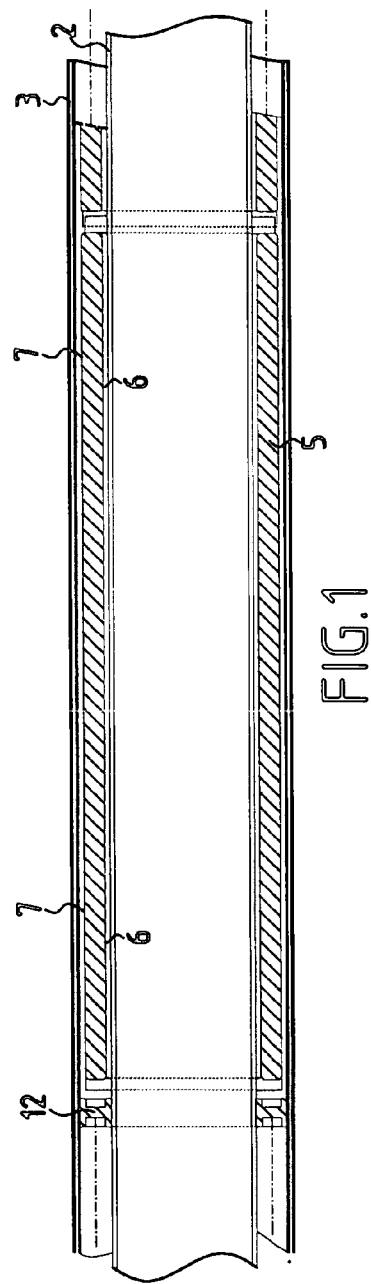
FIG. 1 is an axial longitudinal section of a PIP comprising an evacuated insulating tubular complex situated between an inner duct and an outer duct.

FIG. 1 is an axial longitudinal section view of a PIP comprising an inner pipe 2 held coaxially inside an outer pipe 3 via mechanical links 12 spaced apart in optionally regular manner, with an evacuated insulating tubular complex 1 being situated between the two pipes 2, 3.

The tubular complex 1 comprises:
- a case 4 of insulating material 5 confined between the inner wall 6 and the outer wall 7 of said case 4;
- each of said walls 6, 7 being constituted by sheet metal, preferably stainless steel or aluminum, more preferably Invar, having thickness lying in the range 0.05 mm to 0.5 mm, providing the insulating tubular complex with mechanical strength and acting as a molecular barrier against the migration of gas;
- the tubular insulating material 5 is made of a rigid insulating material such as open-celled polyurethane foam or the like, a non-rigid porous material such as a sheet of glass fibers or of ceramic fibers, or a nano-porous material, or indeed an aerogel; and
- the insulating tubular complex is evacuated in a manner that is explained below.

When making the cases, it is particularly advantageous to use Invar, a nickel-based steel presenting a coefficient of thermal expansion that is practically zero, since that makes it possible to minimize the effects of differential expansion between the outer wall which is at sea-bed temperature, i.e. 4° C. to 5° C., and the inner wall which is at the temperature of the fluid being transported, which temperature may exceed 200° C. Such differential expansion leads to very high stresses at the ends of the tubular cases, that can lead to phenomena of rupture or of fatigue during heating and cooling cycles over the lifetime of an installation, which can exceed 20 years.

Figure 2:
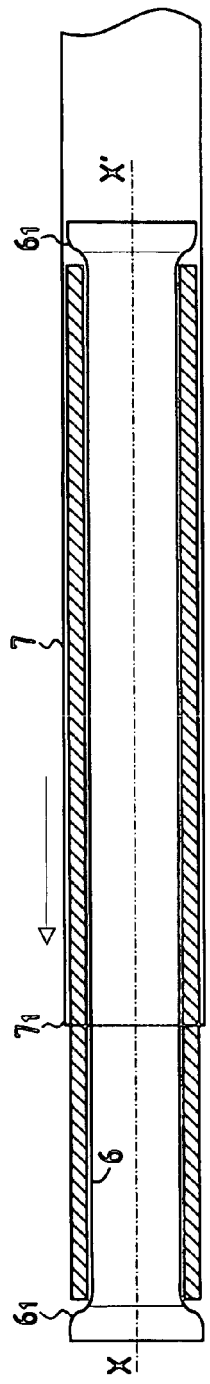
FIG. 2 is an axial longitudinal section view of an evacuated insulating tubular complex of the invention showing in detail one way of forming "bells" at the opposite circular ends of the case.
Figure 3:
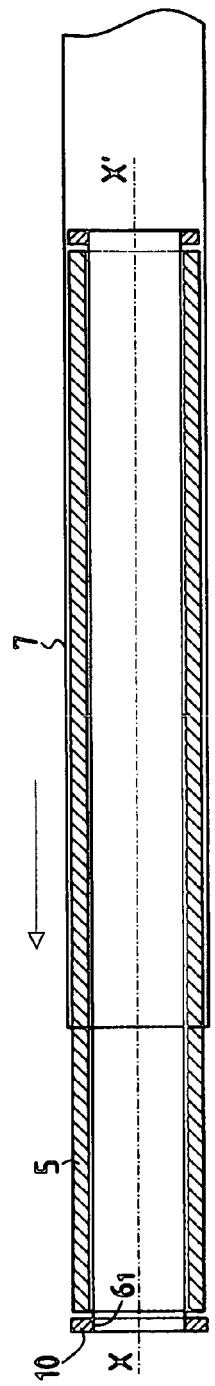
FIG. 3 is an axial longitudinal section of an evacuated insulated tubular complex of the invention showing in detail one way of making connection ends for the inner and outer walls of the case.

FIGS. 2 and 3 are longitudinal section views of ways in which an insulating tubular complex can be made with the tubular insulating material 5 surrounding the inner wall 6, the outer wall 7 being engaged thereon by moving from right to left. The ends of said insulating tubular complex are sealed in the longitudinal direction 8A, 8B in the embodiment of FIG. 2 by flaring the end edges $6_1$ in the longitudinal direction XX' of the inner wall 6 by stamping or hydroforming, so that the outside diameter of said inner wall accurately matches the inside diameter of said outer wall 7. This makes it possible to achieve completely leaktight closure merely by welding either by performing the TIG method, well known to the person skilled in the art of welding, or by laser welding, or by any other type of welding, or indeed by bonding together the end edges $6_1$, $7_1$ of the inner and outer walls using adhesive.

In FIG. 3, a cylindrical fitting 10 is welded firstly to the inner cylindrical wall 6 at $6_1$ and secondly to the outer cylindrical wall at $7_1$ after it has been engaged over the insulating material.

FIG. 4 shows the outer cylindrical wall 7 of an insulating tubular complex constituted by a metal strip presenting corrugations 9 over a fraction of its length, the corrugations being made by stamping, and also presenting optionally circular orifices 11 used for evacuating the insulating tubular complex prior to finally closing said orifices with capsules (not shown) that are placed thereon and welded in position, e.g. using a power laser, or else they are secured by adhesive.

FIGS. 5A and 5B show a section of the outer wall 7 corresponding to plane AA in FIG. 4, showing a circular section configuration for the end of the outer wall 7 having a radius $R_{max}$ that is slightly greater than the outside diameter of the insulation, and than the outside diameter of the device for coupling to the inner wall, as described above with reference to FIGS. 2 and 3.

FIGS. 6A and 6B show a section of the outside wall 7 corresponding to plane BB in FIG. 4, showing a substantially circular configuration of radius $R_{max}$ and presenting three series $9_1$, $9_2$, $9_3$ of corrugations 9 that are offset by 120°. These corrugations are obtained by stamping the strip while flat, prior to being rolled to form a substantially circular cylinder and prior to implementing longitudinal welding along the axis XX' so as to join together two generator lines, as described below with reference to FIG. 8.

In FIG. 5B, there can be seen a plane developed view of the outer wall 7 of the case 4 with two reference points $P_1$ and $P_2$ marked thereon that are spaced apart by a length L. These points $P_1$ and $P_2$ are also identified on the circular shape of FIG. 5A.

In FIG. 6B is a plane developed view of the outer wall 7 having two referenced points $P_3$ and $P_4$ marked thereon that are spaced apart by a length L. These points $P_3$ and $P_4$ are also shown on the circular shape of FIG. 5A.

Figure 8:
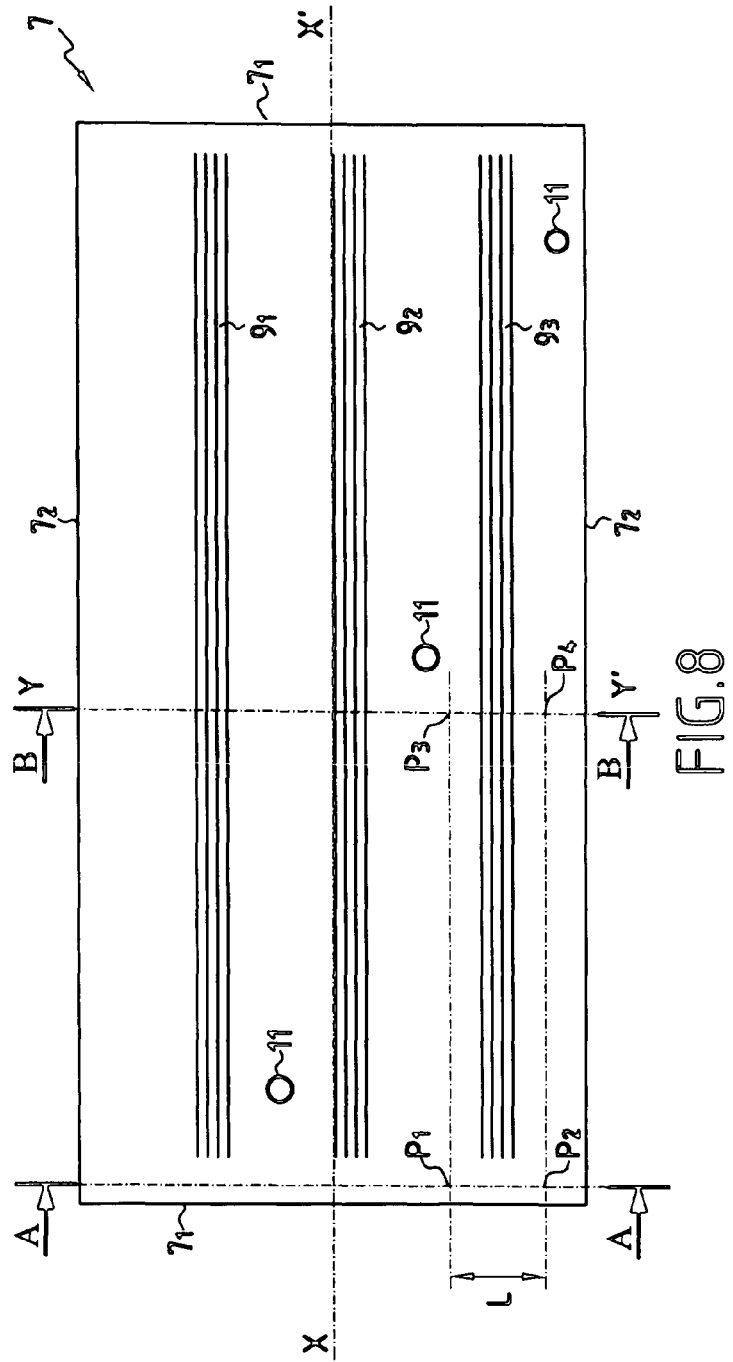
FIG. 8 is a plane developed view of the outer wall of the case and FIGS. 8A and 8B are sections relating to planes AA and BB in FIG. 8.

The stamping described with reference to FIG. 8 leads to stretching in the transverse direction YY' in said portion of width L in the material that leads to an extra length δl of the developed view relative to the distance L between the reference points $P_3$ and $P_4$, thus giving the wall a degree of flexibility that is described below with reference to FIGS. 7A and 7B.

To clarify the explanations, in FIGS. 6A and 7A, only the outer wall 7 of the case is shown, the outside diameter of the insulation 5 being represented by the circle 5A, and the inner wall 6 being omitted.

FIG. 6A shows the outer wall 7 of the case of the insulating tubular complex when at rest, at atmospheric pressure, after its variant components have been assembled and welded together, and ready to be evacuated. The clearance that exists between the outer case 4 of inside radius $R_{max}$ and the insulation 5 of outside radius $R_1$ enables the various components to be assembled together by sliding the outer wall 7 of the case 4 longitudinally as explained with reference to FIGS. 2 and 3.

When evacuating the insulating tubular complex 1 via the orifices 11, the inner wall 6 (not shown) tends to increase in diameter in insignificant manner within the limit of the ability of its material to stretch, and it remains substantially circular. In contrast, the outer wall 7 tends to collapse and to shrink in diameter so as to come to bear on the insulating material, as shown in FIGS. 7A and 7B. For this purpose, the circular portions 14 behave like vaults or arches so they remain substantially circular with a radius of curvature shrinking from $R_{max}$ to $R_{min}$, until they come to bear against said insulating material 5, whereas the corrugated portions $9_1$, $9_2$, and $9_3$, which were initially in an expanded configuration $9a$ as shown in FIGS. 6A and 9B, then change shape during evacuation towards a shrunken and clumped-together configuration $9b$, as shown in FIGS. 7A and 7B.

The shrinking of the corrugations $9_1$, $9_2$, and $9_3$ thus serves to absorb the change in the developed length of the outer wall 7 from a circle of radius $R_{max}$ prior to evacuation to a circle of radius $R_{min}$ after evacuation.

Thus, at the ends $8a$, $8b$ of the complex 1 in the longitudinal direction XX',the distance between the reference points $P_1$ and $P_2$ does not change during evacuation, whereas the distance between the reference $P_3$ and $P_4$ passes from the value L prior to evacuation to a value l after evacuation, and for the three series $9_1$, $9_2$, and $9_3$ of corrugations, this gives: $\delta L \approx 3 \times (L-l)\delta L$ corresponding substantially to the reduction in circumference on going from radius $R_{max}$ prior to evacuation to radius $R_{min}$ after evacuation.

Thus, the flexibility provided by the corrugations 9 enables the structure of the outer wall 7 of the case to retain a configuration that is substantially circular during evacuation, thus avoiding creating localized indentations or bumps, which would run the risk of interfering with the inside of the outer pipe 3 during fabrication or installation operations, and that would be risky for the integrity of the system for insulating the PIP.

Figure 8A:
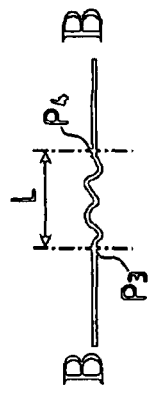
Figure 8B:
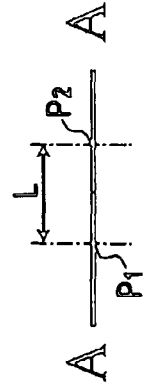

FIGS. 8A and 8B show the outer wall 7 of the case 4 while it is being fabricated, after it has been stamped and prior to being rolled to obtain the circular shape shown in FIGS. 4, 5, 6, and 7. The same reference points $P_1$ & $P_2$ and $P_3$ & $P_4$ are shown spaced apart by the distance L, relating to the metal strip respectively in a zone close to the ends $8a$, $8b$ of the complex 1 (plane AA in FIG. 8A), and in the zone $9_1$, $9_2$, $9_3$ of the corrugations (plane BB in FIG. 8B).

FIG. 9 is a side view in section of the end of an insulating tubular complex as shown in FIG. 2, showing in detail how the inner wall 6 and the outer wall 7 are connected together. The diameter of said outer edge $6_1$ of the inner wall 6 is expanded over a length of a few centimeters, e.g. 1 cm to 2 cm so that the initial outside diameter of said inner wall 6 passes from diameter D1 to diameter D2 which corresponds substantially to the inside diameter of said outer wall 7. This expansion is advantageously implemented using a radially-expandable mandrel, or by hydroforming using water under pressure, using techniques that are known to the person skilled in the art.

In the top portion of FIG. 9, the outer wall 7 is being put into place on the insulating material 9, while in the bottom portion of FIG. 9, the end $7_1$ of said outer wall 7 is being welded directly to the end $6_1$ of the inner wall 6 by means of a laser torch 15 or a plasma torch, the torch being stationary and the insulating tubular complex 1 being set into rotation about its own axis XX'.

In order to minimize thermal bridges between the outer wall 7 and the inner wall 6 at the longitudinal ends $6_1$, $7_1$, FIGS. 10A-10D are side views in section showing a preferred version of an end of an insulating tubular complex of the invention of the kind shown in FIG. 3 in which the connection between the inner wall 6 and the outer wall 7 is provided by a circularly symmetrical intermediate fitting 10 comprising a main body $10a$ of insulating material having good mechanical strength, e.g. a composite material or a syntactic foam, and having secured thereto, e.g. by adhesive, an outer first metal ferrule $10b$ and an inner second metal ferrule $10c$ which overhangs to the left, as shown in FIG. 10B. These two ferrules are made of a metal that is compatible with the inner and outer walls of the case so as to be welded thereto during final assembly of said insulating tubular complex, e.g. using a laser torch 15 or a plasma torch, the torch being held stationary while the insulating tubular complex is set into rotation about its own axis XX', as shown in FIG. 10D.

Since gas molecules can migrate through composite materials and syntactic foams, it is advantageous to electroplate thereon a deposit $10d$ of metal, e.g. of pure nickel, compatible with the base metal of said ferrules $10b$ and $10c$, and as shown in FIG. 10C.

FIG. 10F shows the electroplating process taking place in a vessel $21a$ containing an electrolyte $21b$, the circularly symmetrical intermediate fitting 10 being suspended at the surface of the liquid so that only its bottom face and the side faces of the main body $10a$, together with the bottom portions of the ferrules $10b$ and $10c$ are wetted by the electrolyte $21b$. An anode $21c$, e.g. of pure nickel, supplies the metal ions which are deposited by a direct electric current applied via positive and negative terminals $22a$ and $22b$ to the main body that has previously been covered in a conductive layer (not shown), e.g. a conductive varnish based on particles of carbon, or metal particles, as is known in the art. When the electroplating $20d$ reaches a satisfactory thickness, e.g. a few tens of micrometers, or even a few hundreds of micrometers, the surface of the set of ferrules $10b$-$10c$ associated with the electroplating $10d$ creates a molecular barrier that is continuous, thus enabling the insulating tubular complex to present absolute leaktightness after the ends have been welded circularly as described above with reference to FIG. 10D. In addition, the thermal bridge is considerably reduced since the thickness of metal that is deposited is very small in comparison with the thickness of the inner and outer walls 6 and 7. To reduce said thermal bridge, the face on which the electroplating is performed is advantageously made sinuous as shown at 23 in FIG. 10E in order to increase the distance over which heat is transferred, thereby reducing the temperature gradient between the inner wall 6 and the outer wall 7.

FIG. 10G shows a variant embodiment of the fitting 10 for providing the end junction of an insulating tubular complex of the invention. This fitting is made by stamping so as to form the outer and inner ferrules $10b$ and $10c$ interconnected by a thin annular web $10e$. The thin annular web $10e$ is thinned down by stamping in a manner known to the person skilled in the art so as to minimize the thermal bridge at the end of the insulating tubular complex. The fitting as made in this way advantageously has ferrules $10b$ and $10c$ with thickness of millimeter order, while the thin web $10e$ has thickness lying in the range 0.5 mm to 0.2 mm. Such an end fitting remains more fragile than the above-described fitting $10a$-$10d$, but it is easier to make, and therefore less expensive. The end fitting of FIG. 10G is advantageously reinforced, after stamping and prior to welding, by casting epoxy resin or syntactic foam type material $10f$ suitable for bonding to the walls so as to obtain a shape similar to that shown in FIG. 10C.

In the first embodiment of FIGS. 1 to 10, each of said inner and outer walls is obtained from a metal strip having two parallel opposite end edges in the longitudinal direction XX', i.e. $6_1$ for the inner wall and $7_1$ for the outer wall, and two other parallel opposite longitudinal edges $6_2$ for the inner wall and $7_2$ for the outer wall, such that each forms a rectangular wall, with said parallel opposite longitudinal edges $6_2$ and $7_2$ of each of said walls being end-joined one to the other, preferably by cementing or welding so as to form a said insulating tubular complex.

More precisely, the face of one of said longitudinal edges $6_2$ or $7_2$ of each wall that faces towards the inside of the case is end-joined to the face of the other one of said opposite longitudinal edges $6_2$ or $7_2$ of said wall that faces towards the outside of the case.

In a second embodiment of the invention as shown in FIGS. 11 et seq., an insulating complex is made from plane panels and then an insulating complex having an open tubular structure, i.e. a structure that is discontinuous around a pipe, is formed by bending.

In this second variant embodiment, the insulating complex is suitable for adopting a substantially plane position 30a, said case being made from said inner and outer walls of rectangular or parallelogram shape having two parallel opposite longitudinal edges $6_2$ or $7_2$ of each of said inner and outer walls that are not end-joined one to the other, and that are suitable for being moved towards each other when said complex is bent and put into place around said pipe so as to form a tubular structure 30b of longitudinal axis XX' presenting a peripheral discontinuity 31a, 31b in cross-section.

FIGS. 11 and 20C are respectively a cross-section and an end view of the second embodiment of the invention in which the insulating complex 1 is made from a plane panel 30a that is bent to obtain a substantially tubular shape 30b presenting a longitudinal discontinuity 31 defined by the opposite longitudinal sides 8c and 8d of said plane panel 30a. The plane panel has an inner wall 6 constituted by a plane metal strip, and an outer wall 7 constituted by a metal strip characterized in that said strip presents longitudinal corrugations to the longitudinal axis XX'. Thus, while the plane panel is being bent as shown in FIG. 12, which is preferably performed on a mandrel of diameter D, the inner wall 6 takes up a circular shape substantially matching that of the mandrel, while the corrugated outer wall 7 bends so as to form in its circular portions at the ends 8a and 8b of the complex, a circle that is substantially of diameter D+2e, where e is substantially the thickness of the insulating material prior to bending.

The circumference of the inner wall 6 presents substantially the length $C=\pi D$, i.e. the width L of the plane panel of FIG. 11, whereas the length of the circumference of the outer wall 7 is substantially $C=\pi(D+2e)$.

The extra length needed for bending to take place under good conditions thus corresponds substantially to $\delta C=2\pi e$, where said extra length is provided by deforming the corrugations which go from a compact state 9c when the panel is plane as shown in FIG. 11a to an extended state 9d when the panel is bent to a diameter D, as shown in FIG. 12A. Thus, while bending a plane panel so as to obtain a substantially circular shape, the inner and outer walls 6 and 7 are subjected to bending forces only, thus limiting any risk of said walls 6 and 7 rupturing or any risk of the insulating material being flattened, whether during forming or throughout the lifetime of the insulating tubular complex which may reach or exceed 20 years, or even 30 years or more.

FIGS. 13 and 14 are perspective views of the plane panel type complex in a plane configuration 30a prior to being bent and in a tubular configuration 30b after being bent.

Figure 15:
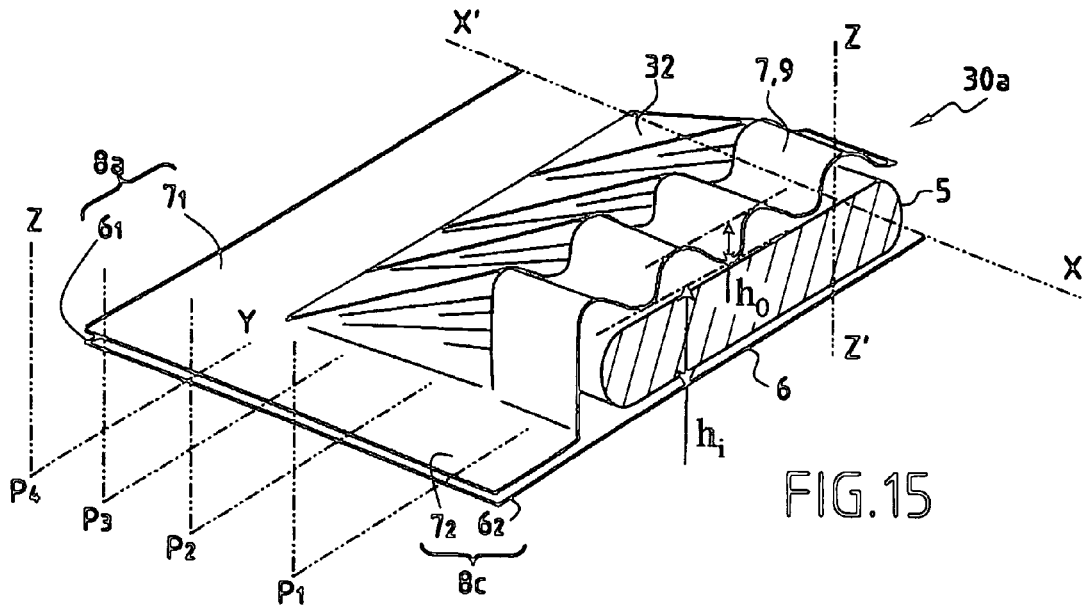
FIG. 15 is a perspective view of a plane panel type insulating complex of FIGS. 11 and 13 showing in detail the transition zone between the corrugated top wall or outer wall and the plane bottom wall or inner wall of said plane panel.

FIG. 15 is a perspective view showing the junction between the walls of the case of a plane panel type complex 30a corresponding to FIG. 13, shown in detail the transition zone 32 between the inner wall 6 and the corrugated outer wall 7.

Figure 15A:
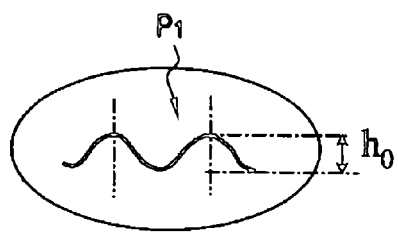
FIGS. 15A-15D are cross-sections on respective planes P1, P2, P3, and P4 of the corrugated outer wall of said plane panel of FIG. 15.
Figure 15B:
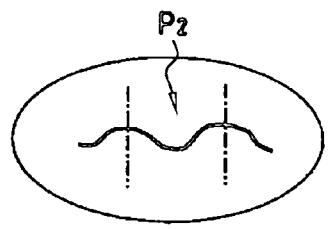
Figure 15C:
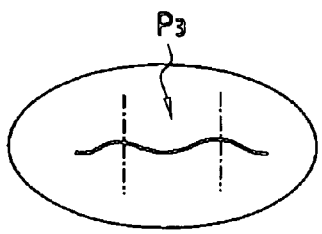

FIG. 15A is a section of FIG. 15 on plane P1 showing a corrugation of amplitude $h_0$ obtained while stamping the outer wall 7 in order to create a gap of height $h_i$ serving to receive the insulating material 5. In the transition zone 32, the height of the corrugations decreases progressively, preferably in linear manner, as shown in FIGS. 15B and 15C corresponding respectively to sections of FIG. 15 in planes P2 and P3, with the corrugation in plane P3 being less pronounced than the corrugation in plane P2, with the P2 corrugation being of amplitude less than $h_0$.

Figure 15D:
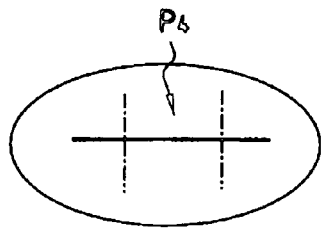

FIG. 15D corresponds to a section of FIG. 15 on plane P4 and beyond, the outer wall 7 then no longer presenting any corrugation. It is in direct contact with the inner wall 6 ready for being welded thereto along their longitudinal edges $6_2$, $7_2$ beside the longitudinal edges 8c of the complex and ready for their end edges $6_1$, $7_1$ to be welded together beside the ends 8a, 8b in the longitudinal direction of the complex, e.g. by means of a laser torch 15 or a plasma torch.

FIG. 16 is a cross-section of a PIP comprising an inner pipe 2, and outer pipe 3, and two superposed insulating tubular complexes $30b_1$ and $30b_2$ of the rolled plane type as described above with reference to FIGS. 13 and 14, said insulating tubular complexes being installed one on the other and opposite ways round, i.e. their open longitudinal generator lines 31 are offset by 180° and each outer insulating complex $30b_2$ lies over portions of two inner insulating complexes $30b_1$.

FIG. 17 is a longitudinal axial section showing the longitudinal offset between the outer insulating tubular complexes $30b_2$ relative to the inner insulating tubular complexes $30b_1$ so as to minimize thermal bridges between the inner pipe 2 and the outer pipe 3.

In one embodiment of this second variant, said inner and outer walls are rectangular in shape when a complex is in its plane position 30a, and after said complex has been bent around a said pipe, it takes up a shape of a said open tubular structure 30b presenting a discontinuity along one of its generator lines 31a in said longitudinal direction XX', and said opposite ends 8a, 8b in the longitudinal direction of said complex formed by the respective edges of said inner and outer walls form a cylindrical surface that is open along a said generator line 31a in said longitudinal direction XX', which cylindrical surface has a diameter that is substantially equal to the inside diameter of the insulating material of substantially tubular shape confined in said case.

In another embodiment of this second variant, the end edges $6_1$, $7_1$ and the longitudinal edges $6_2$, $7_2$ of said inner and outer walls define a parallelogram having an angle preferably lying in the range 15° to 60° when said complex is in said plane position, said parallelogram being suitable for winding around a said pipe so as to form a said tubular structure presenting a discontinuity along a helical bend 31b formed by the gap between said longitudinal edges 8c, 8d of said complex that are not end-joined one to the other after said complex has been wound.

FIGS. 18 and 19 show an insulating tubular complex of this type obtained from a rolled plane panel, said plane panel 30a being a parallelogram with an acute corner of angle $\alpha=60°$. The corrugations 9 remain parallel to the axis XX' of the pipe and are thus perpendicular to the end edges 8a and 8b and thus present the same angle of incidence α relative to the opposite longitudinal edges 8c and 8d.

This version of the invention presents a considerable advantage which is described below with reference to FIGS.

20A, 20B, and 20C for explaining the different stages in fabricating a tubular element from such a plane element.

FIG. 20A shows a steel tubular pipe 40 made from a rolled-up metal sheet, said rolled-up sheet being welded longitudinally at 40a. During the rolling process and prior to welding, it is necessary to obtain the almost perfect circular shape shown in FIG. 20B in which the radius of curvature r is practically constant over the entire periphery all the way to the two edges 40b. This is mechanically very difficult to achieve and is usually performed on commercially available rolling machines by a "rounding" operation known to the person skilled in the art which consists in pre-curving the longitudinal edges 40b so as to give them curvature close to the desired final curvature, with rolling then being performed in conventional manner. FIG. 20C shows a steel tubular pipe that has been rolled without any "rounding" operation and which presents in a zone close to its longitudinal edges 40b, a portion that is practically rectilinear, i.e. of radius that is infinite. This leads to a projection which is generally not acceptable on a tubular item.

When bending a plane panel to obtain an insulating tubular complex, it is desirable to avoid the configuration shown in FIG. 20C since the resulting projecting runs the risk of interfering with the inside of the outer pipe of the PIP, and of being damaged while it is being inserted inside said outer pipe. It is very difficult to pre-curve such a plane panel by "rounding" since there is a danger of completely flattening the insulating structure which remains very fragile in spite of its metal case. For a rectangular plane panel, and in the absence of a "rounding" operation, it is nevertheless possible to force the longitudinal edges 8c, 8d to remain in contact with the outside of the inner pipe by securing said edges to said pipe, e.g. by adhesive or by using adhesive tapes. However, it would then be necessary for one of said longitudinal edges 8c, 8d to be held fully and very firmly not only during the rolling stage, but also throughout the duration of prefabricating and installing the PIP. The same applies to the other edge which, at the end of rolling, needs to be securely held in the same manner.

When rolling a panel that is parallelogram-shaped and presents a tip having an acute angle α, as shown in FIGS. 18 and 19, the initial stage of rolling consists in securing the corner 8e of said parallelogram to the outer wall of the pipe. This tip presents a very small area since it can be restricted to the triangle between said corner proper and the plane AA, e.g. a height of 5 cm to 10 cm. Thereafter, during winding, the side 8c of the parallelogram naturally takes up a circular shape and presents a radius of curvature that is substantially constant until the second tip 8e of the said parallelogram is pressed and held in position against said inner pipe, e.g. by adhesive or using an adhesive tape.

For two plane panels of parallelogram shape rolled one on top of the other, care should be taken to offset said tips radially by half a length of the panel in the longitudinal direction in order to minimize thermal bridges, as explained above with reference to FIGS. 16 and 17 for the discontinuous junction zone between the longitudinal edges 8c and 8d of a first complex being covered by the solidly continuous central portion of a superposed second complex.

In another embodiment of the invention (not shown in the figures), a plane panel having two or three times the width, i.e. developing to a circumference that is two or three times as great, is rolled up onto itself so as to form two or three superposed layers in such a manner as to eliminate the longitudinal thermal bridge. In order to avoid extra thicknesses as the longitudinal edge, care should be taken to chamfer said longitudinal edges in the insulating material. This simplifies fabricating and installing the complex around the pipe compared with the embodiment having plane panels that are offset and superposed. However, it suffers from the drawback of not eliminating the transverse thermal bridge at the junction between two panels that have been rolled up in this way and that are placed longitudinally end to end.

Figure 21:
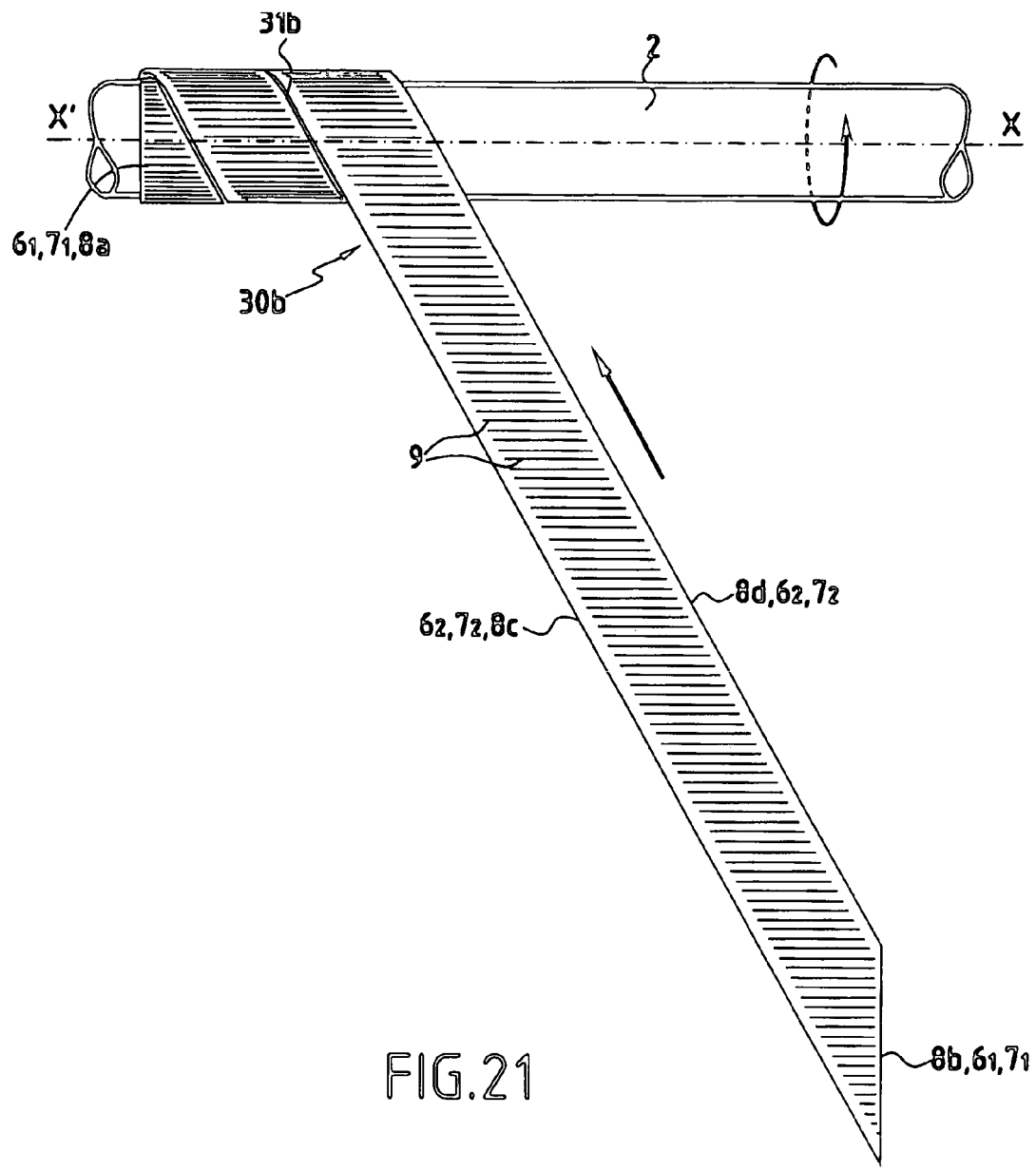
FIG. 21 is a side view of an inner pipe around which a plurality of turns of a parallelogram-shaped plane panel of the invention have been wound, thus constituting a spiral-wound strip.

FIG. 21 is a side view of spiral-winding several turns of a single layer of a complex constituted by a narrow insulating panel of very great length, presenting in its outer wall corrugations of the invention that extend parallel to the axis XX' of the pipe. Only the first layer is shown, but advantageously a superposed second complex is applied so as to constitute a second layer that is offset by half the pitch so as to minimize thermal bridges.

In an implementation of fabricating an insulated pipe or a set of insulated pipes of the invention, the following steps are performed:

1) applying said insulating material (5) on a first metal strip constituting said inner wall (6) coated on a said pipe, so that said insulating material presents a tubular shape; then 2) covering said insulating material in a second metal strip that is corrugated and constitutes said outer wall (7) of the case; then 3) making said opposite ends of said complex by sealing together said respective end edges ($6_1$, $7_1$) of said inner and outer walls; and 4) partially evacuating the case.

The invention claimed is:

1. An insulating complex configured to be placed around a pipe having a longitudinal direction XX', the complex comprising an insulating material confined in a partial vacuum in a case, said case comprising an inner wall and an outer wall, wherein:
    said inner and outer walls are made of rectangular or parallelogram-shaped metal strips, each having two parallel opposite end edges and two parallel opposite longitudinal edges;
    said inner and outer walls are sealed to each other, at least at said respective end edges defining opposite ends of said complex in said longitudinal direction XX' after the complex is placed around said pipe;
    said two longitudinal edges of each of said inner and outer walls are either sealed to each other or sealed to the two longitudinal edges of the other of said inner and outer walls; and
    at least one of said inner and outer walls includes at least one corrugated zone having transverse corrugations extending in the longitudinal direction XX' between said opposite ends of said complex in the longitudinal direction XX'.

2. The insulating complex according to claim 1, wherein said metal strips are made of stainless steel, of Invar, or of aluminum, and have a thickness in the range from 0.05 mm to 0.5 mm, and wherein said insulating material has a thickness in the range from 5 mm to 100 mm.

3. The insulating complex according to claim 1, wherein said insulating material is a nano-porous material and comprises at least one of the following materials:
    inorganic materials in powder, granule or woven or non-woven fiber form, materials based on minerals, silica, alumina, perlite, and materials based on glass fibers or on ceramic fibers; and
    open-celled organic materials, and a polyurethane foam; and
    combined organic and inorganic materials and a polyurethane foam reinforced by fibers or composite materials.

4. The insulating complex according to claim 1, wherein a pressure inside said case is less than 5 mbar.

5. The insulating complex according to claim 1, wherein said two parallel opposite longitudinal edges of each of said inner and outer walls are sealed to each other, and wherein said insulating complex is in a substantially tubular shape, whereby:
- each of said opposite ends of the complex presents a shape defined by cylindrical surfaces of a circular section of an axis corresponding to said longitudinal direction XX' of said end edges of each of said inner and outer walls; and
- said corrugated zone between said opposite ends of said complex is defined by a cylindrical surface of said longitudinal axis having a cross-section that is partially circular including said corrugations; and
- the other of said inner and outer walls is defined by a cylindrical surface having a circular cross-section without corrugations.

6. The insulating complex according to claim 5, wherein said corrugated zone occupies only a fraction of a periphery of the of said at least one of said inner and outer walls, and wherein said corrugations are spaced apart and distributed symmetrically and regularly along a perimeter of said partially circular cross-section.

7. The insulating complex according to claim 5, wherein each of said inner and outer walls is obtained from a rectangular metal strip in which the two parallel opposite longitudinal edges of each of said walls are end-joined one on the other to form said insulating complex.

8. The insulating complex according to claim 7, wherein a face of one of said longitudinal edges of one of said walls that faces towards an inside of the case is end-joined to a face of the other one of said opposite longitudinal edges of the other one of said walls that faces towards an outside of the case.

9. The insulating complex according to claim 1, wherein said opposite ends of the complex are constituted by faces on an inside of the case of said respective end edges in said longitudinal direction XX' of each of said inner and outer walls and are sealed directly each other.

10. The insulating complex according to claim 9, wherein said opposite ends in said longitudinal direction XX' of said complex formed by said respective end edges of said inner and outer walls form a cylindrical surface of diameter substantially identical to an outside diameter of the insulating material of substantially tubular shape confined in said case.

11. The insulating complex according to claim 1, wherein said opposite ends of the complex are constituted by faces inside the case of said respective end edges in said longitudinal direction-XX', sealed by adhesive against a connection device of annular shape comprising a main body of rigid insulating material of annular shape, the main body having an inner cylindrical face to which the face inside the case of said end edge of the inner wall is sealed, and having an outer cylindrical face to which the inside face of said end edge of the outer wall is sealed.

12. The insulating complex according to claim 1, wherein said two longitudinal edges of each of said inner and outer walls are sealed to the respective longitudinal edges of the other of said inner and outer walls to form the longitudinal edges of said complex, said parallel opposite longitudinal edges of said complex not being end-joined one against the other when said complex is bent or wound around said pipe.

13. The insulating complex according to claim 12, wherein said parallel opposite longitudinal edges of said complex are moved towards each other when said complex is bent into a layer or spiral-wound into a layer over a plurality of turns around said pipe in order to cover said pipe, forming an open tubular structure of the longitudinal direction XX' presenting a discontinuity between said two longitudinal edges of the complex.

14. The insulating complex according to claim 12, wherein said complex is rolled up onto itself to form a plurality of superposed layers around said pipe, using the same complex, thereby eliminating any discontinuity of insulation between said two longitudinal edges of said complex.

15. The insulating complex according to claim 12, wherein said corrugated zone substantially covers an entire width of said at least one of said inner and outer walls in a transverse direction, when said complex is in a substantially plane developed configuration.

16. The insulating complex according to claim 12, wherein:
- said opposite ends of the complex in said longitudinal direction XX' are constituted by faces inside the case of said respective end edges of each of said inner and outer walls directly sealed against each other; and
- the longitudinal edges of said complex are constituted by the faces inside the case of said longitudinal edges of each of said inner and outer walls, sealed directly to each other.

17. The insulating complex according to claim 16, wherein said inner and outer walls are of rectangular shape when said complex is in a plane developed configuration, and after said complex is bent around said pipe, said complex forms an open tubular structure presenting a discontinuity along a generator line extending in said longitudinal direction-XX'.

18. The insulating complex according to claim 17, wherein said opposite ends in said longitudinal direction of said complex formed by the respective edges of said inner and outer walls form an open cylindrical surface along a generator line in said longitudinal direction XX', and wherein said cylindrical surface has a diameter substantially identical to an inside diameter of the insulating material of substantially tubular shape confined inside said case.

19. The insulating complex according to claim 12, wherein the end edges and the longitudinal edges of said inner and outer walls define a parallelogram when said complex is in a plane developed configuration, said parallelogram being one of bent, and wound in a plurality of turns, constituting a single layer around said pipe in order to form a tubular structure presenting a discontinuity along a helical bend formed by a gap between said longitudinal edges of said complex that are not end-joined one to the other after said complex is one of bent, and wound, around said pipe.

20. The insulating complex according to claim 1, wherein said case includes at least one closable orifice enabling the case to be partially evacuated.

21. An insulated pipe structure comprising a pipe and individual tubular complexes according to claim 1 placed around said pipe.

22. The insulated pipe structure according to claim 21, wherein said individual tubular complexes are disposed contiguously to one another in said longitudinal direction XX' around said pipe, each having a length in the range from 2 m to 10 m.

23. A set of two coaxial pipes presenting an inner pipe and an outer pipe including individual tubular complexes according to claim 1 placed in an annular gap between said two pipes, wherein said individual tubular complexes are placed around said inner pipe.

24. The set of two coaxial pipes according to claim 23, wherein said outer and inner pipes are interconnected by centralizing mechanical links comprising parts made of plastics material, against which said ends of some of said tubular complexes come into abutment.

25. The set of two coaxial pipes according to claim 23, wherein a pressure in the gap between said two pipes, outside the case, is less than 5 bars.

26. The set of two coaxial pipes according to claim 23, wherein the individual insulating complexes are disposed one after another along said longitudinal direction-XX', and also disposed one on another so that an outer insulating complex covers longitudinal gap zones each constituted by the two longitudinal edges of a corresponding inner insulating complex that are close together but not end-joined to each other, and one or more end gap zones constituted by the end edges of two inner insulating complexes spaced longitudinally end to end.

27. A method of fabricating a pipe, the method comprising:
preforming a tubular complex according to claim 1; and
one of:
threading said tubular complex around said pipe; and
threading said tubular complex around an inner annular gap in said pipe formed by a set of two coaxial pipes.

28. A method of fabricating an insulated pipe, according to claim 21, the method comprising:
making an insulating complex in a plane developed configuration; and
forming the insulated pipe by one of:
bending or winding said complex on said pipe, and
bending or winding said complex on an inner pipe of a set of two coaxial pipes.

29. A method of fabricating a set of two coaxial pipes according to claim 23, the method comprising:
1) applying said insulating material on a first metal strip constituting said inner wall covering said pipe so that said insulating material presents a tubular shape; then
2) covering said insulating material with a second metal strip that is corrugated to constitute said outer wall of the case; then
3) making said opposite ends of said complex by sealing together said respective end edges of said outer and inner walls; and
4) partially evacuating the case.

30. A method of fabricating an insulating complex according to claim 1, the method comprising:
1) applying said insulating material on a first metal strip constituting said inner wall itself placed on a tubular mandrel or on a plane surface; then
2) covering said insulating material in a second metal strip that is corrugated, constituting said outer wall of the case; then
3) making said opposite ends of said complex by sealing together said respective end edges of said outer and inner walls.

* * * * *